March 24, 1953  A. A. KOTTMANN  2,632,551
ARTICLE HANDLING AND TRANSFER APPARATUS
Filed April 10, 1947  10 Sheets-Sheet 1

INVENTOR.
Arthur A. Kottmann
BY
Evans + McCoy
ATTORNEYS

INVENTOR.
Arthur A. Kottmann
BY
Evans + McCoy
ATTORNEYS

March 24, 1953 A. A. KOTTMANN 2,632,551
ARTICLE HANDLING AND TRANSFER APPARATUS
Filed April 10, 1947 10 Sheets-Sheet 3
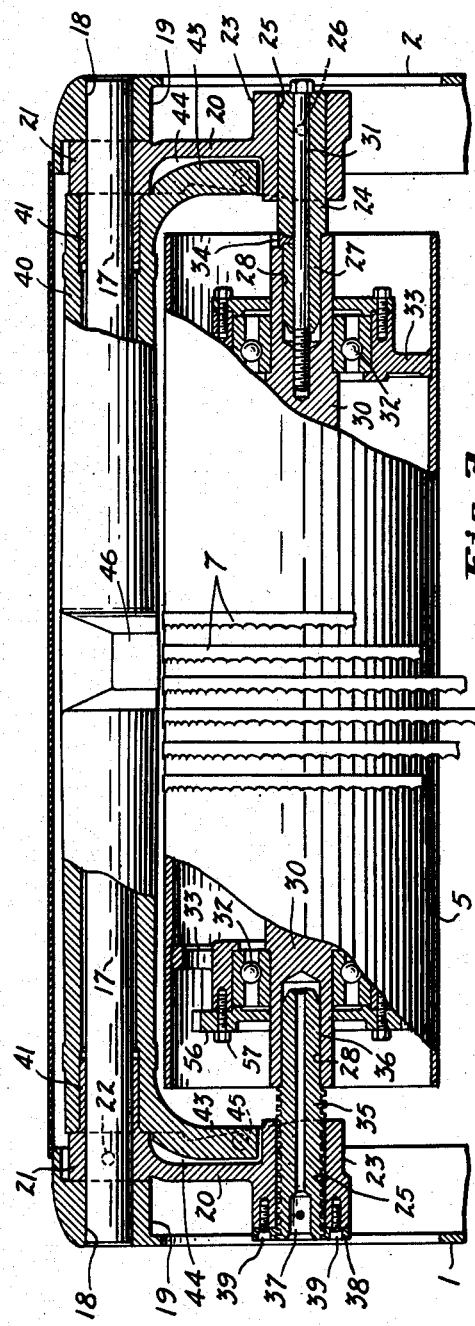
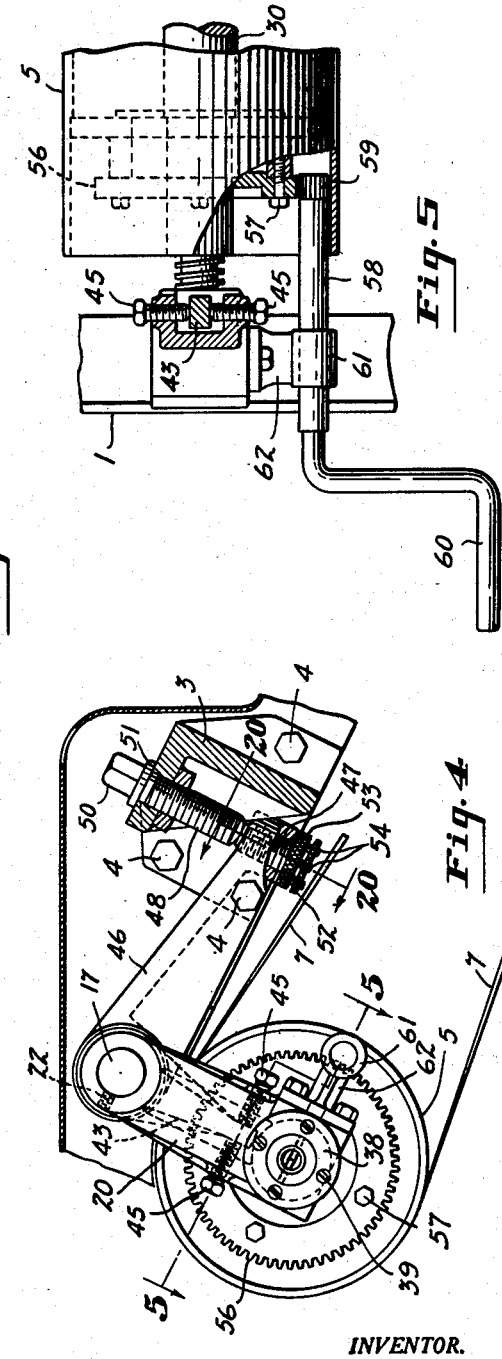
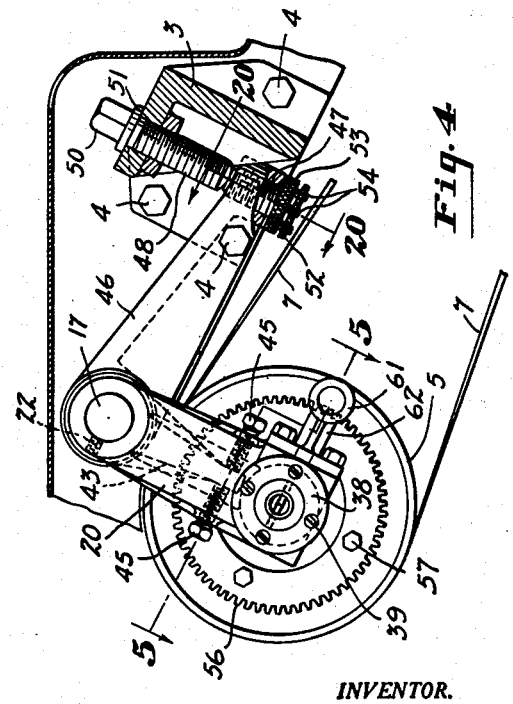
INVENTOR.
Arthur A. Kottmann
BY
Evans + McCoy
ATTORNEYS

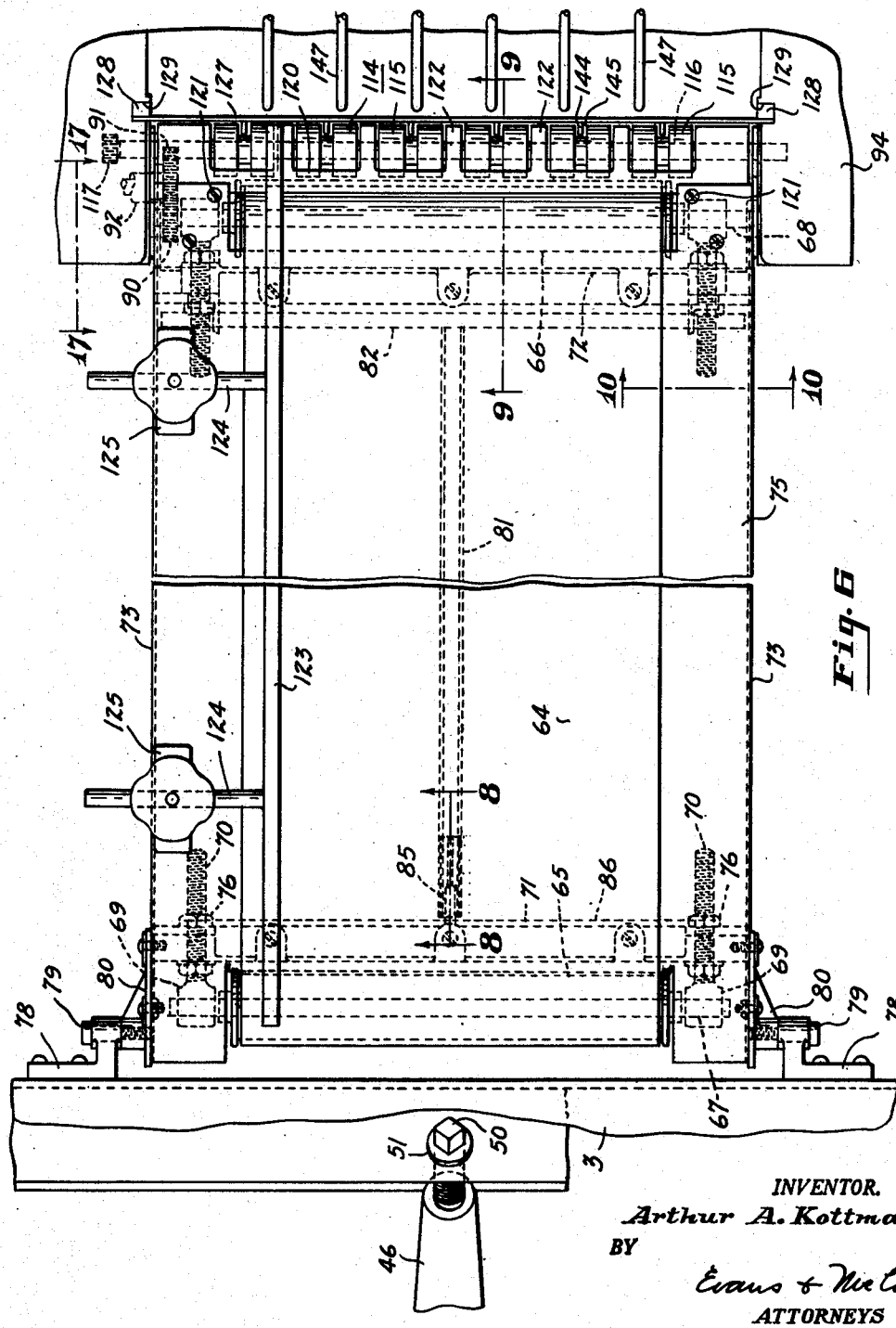

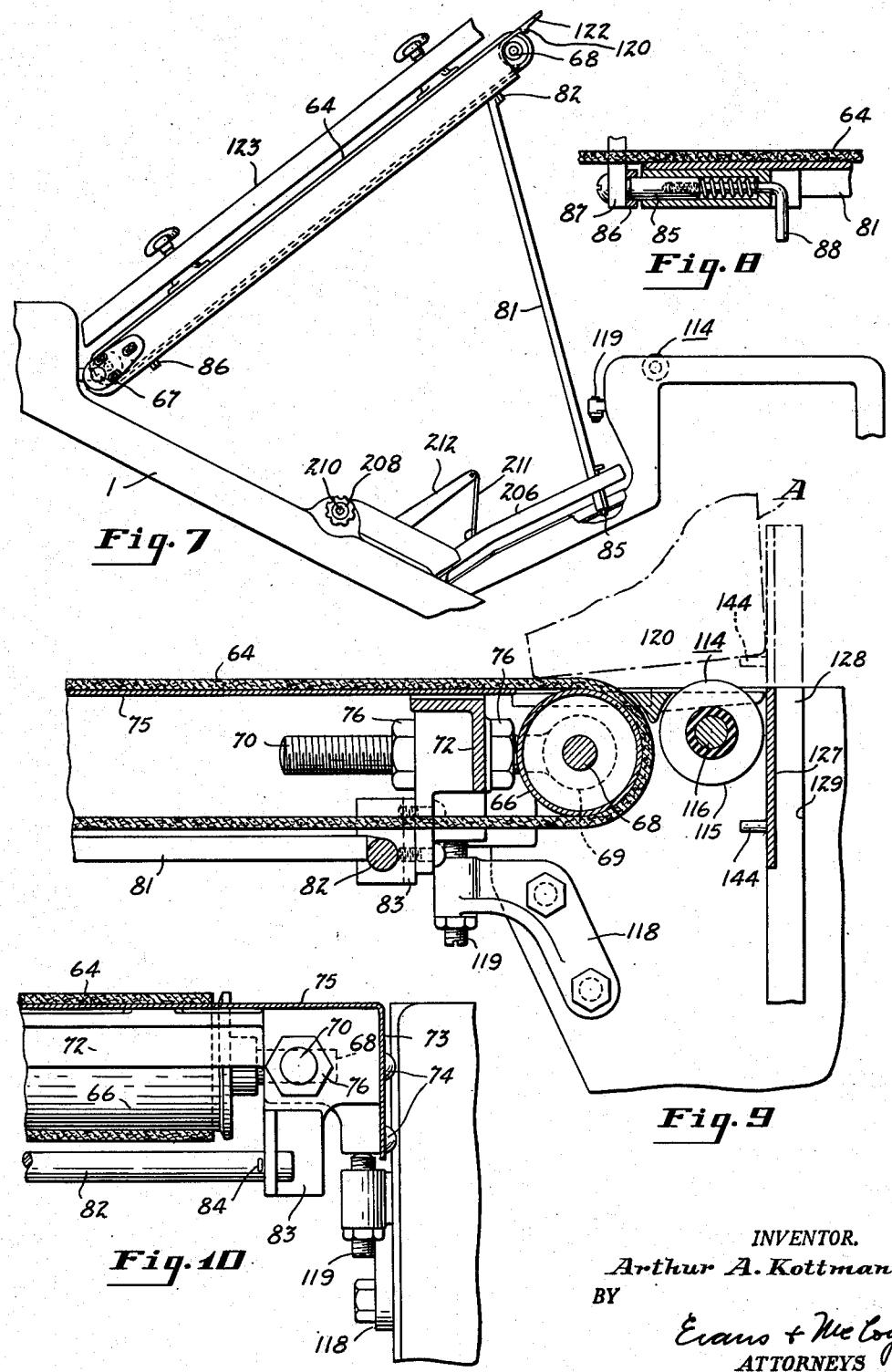

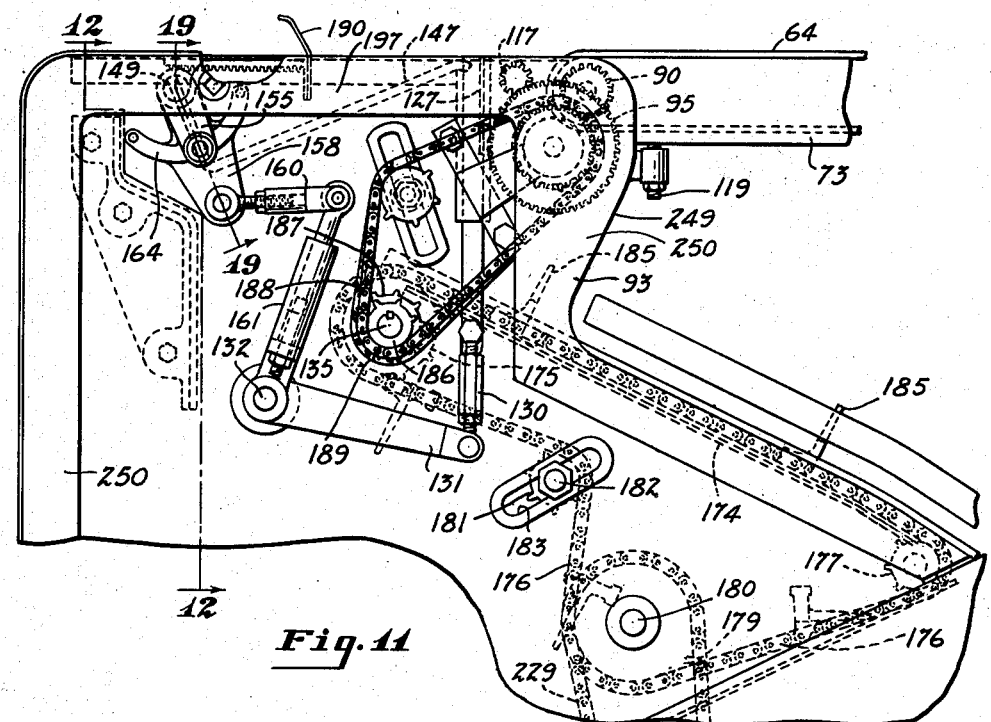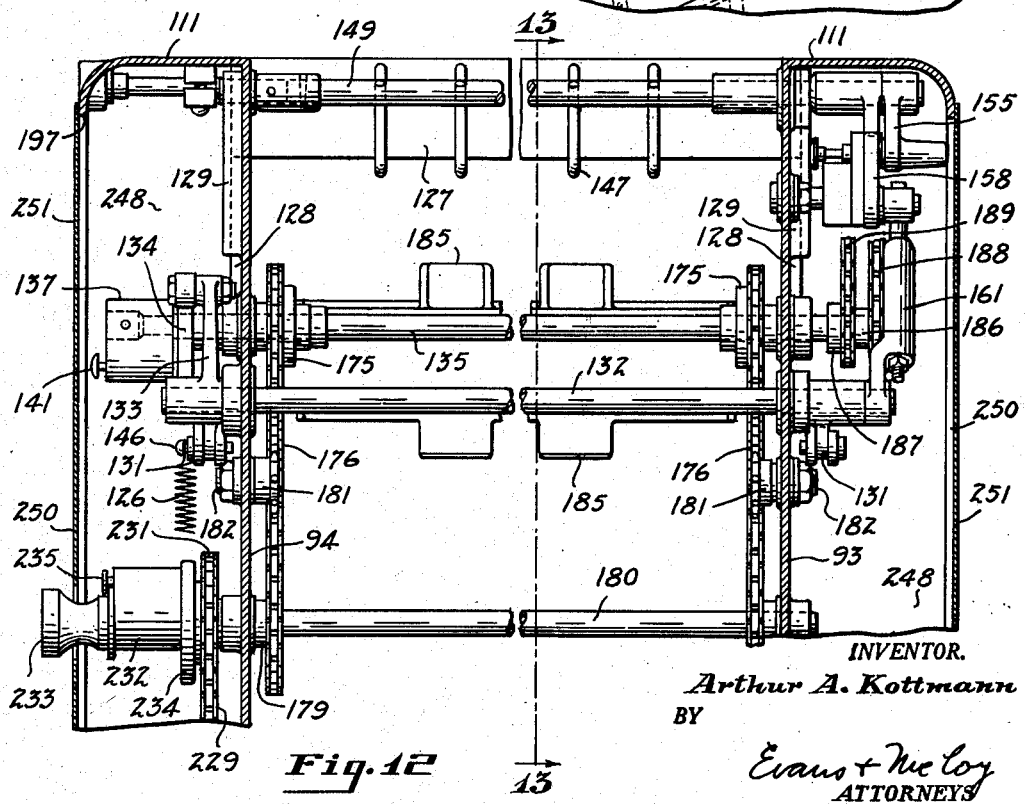

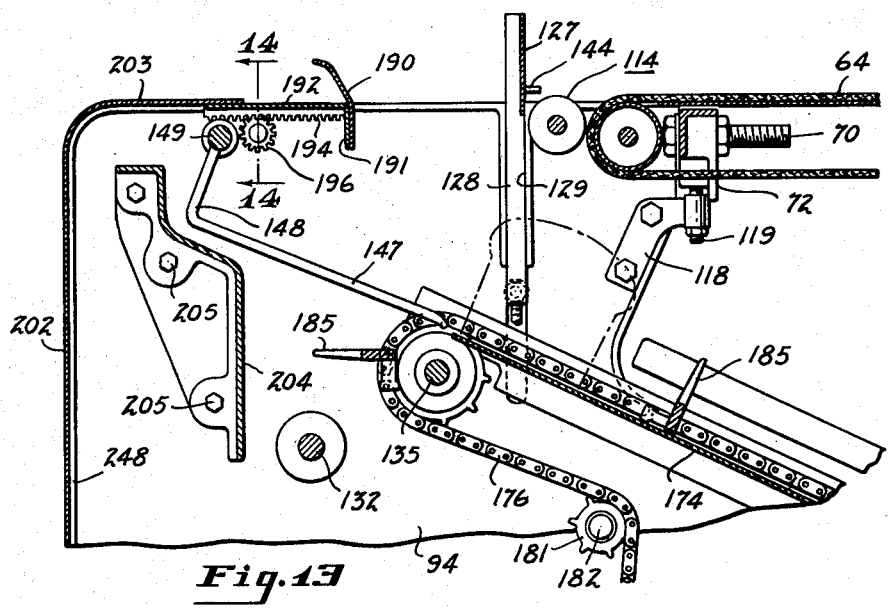
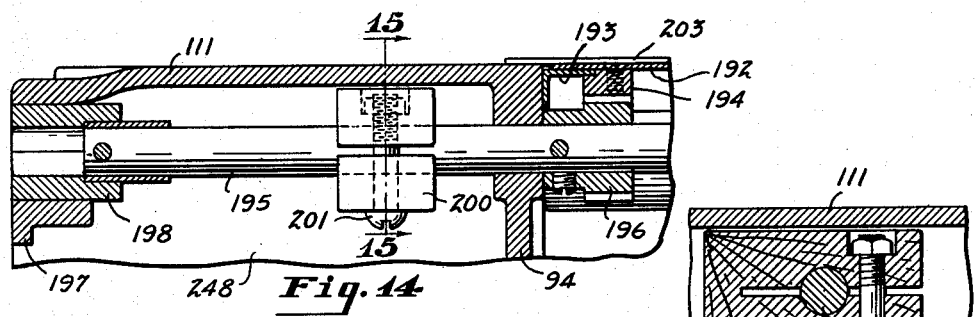
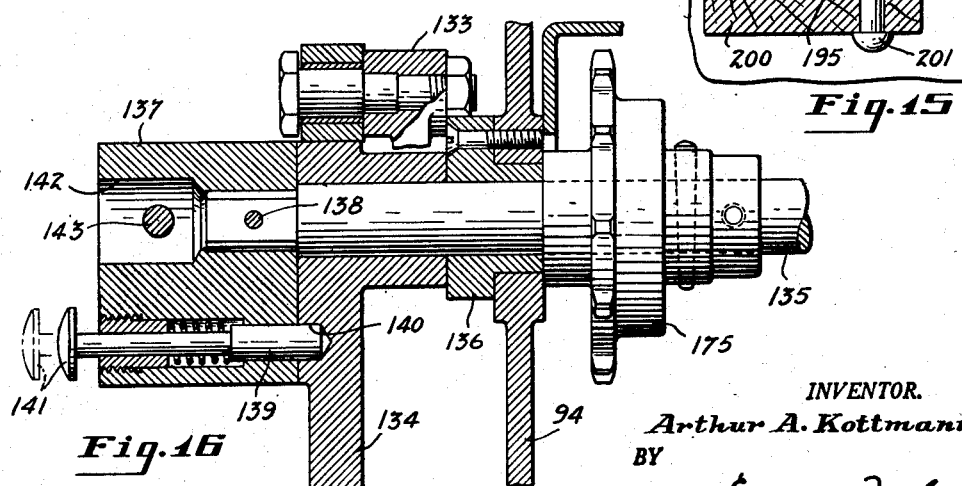

INVENTOR.
Arthur A. Kottmann
BY
Evans & McCoy
ATTORNEYS

March 24, 1953     A. A. KOTTMANN     2,632,551
ARTICLE HANDLING AND TRANSFER APPARATUS
Filed April 10, 1947     10 Sheets-Sheet 9
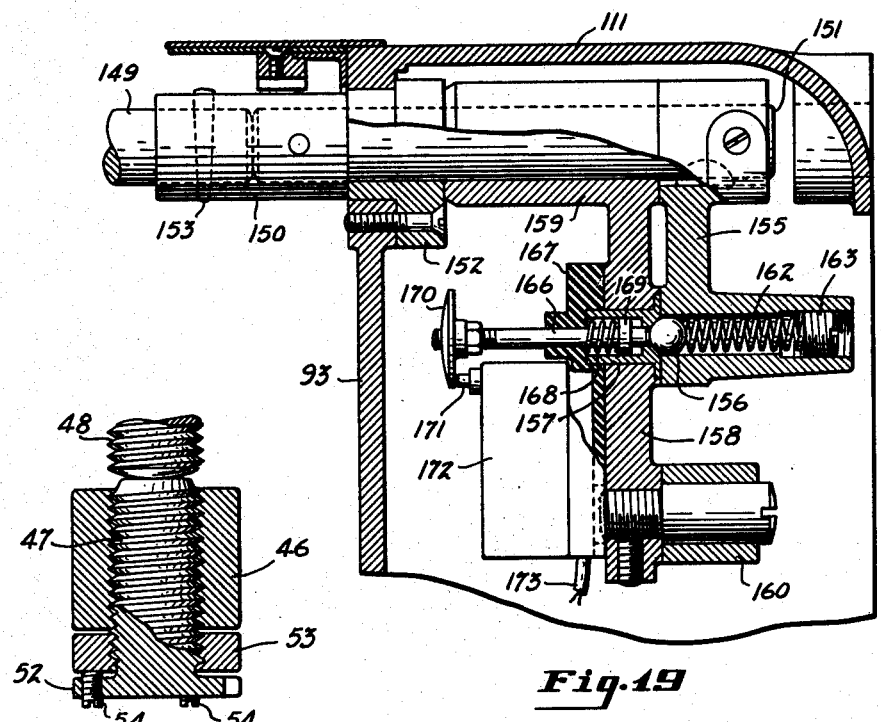
Fig. 19
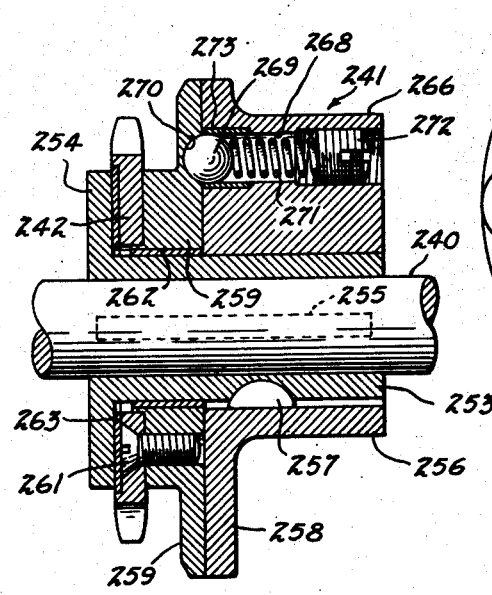
Fig. 20
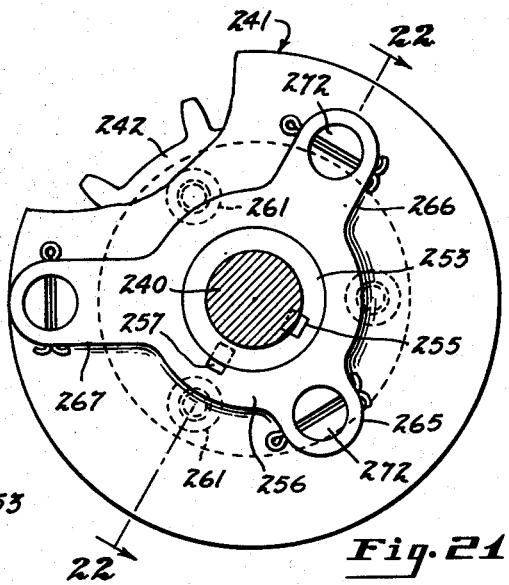
Fig. 21
Fig. 22
INVENTOR.
Arthur A. Kottmann
BY
Evans & McCoy
ATTORNEYS

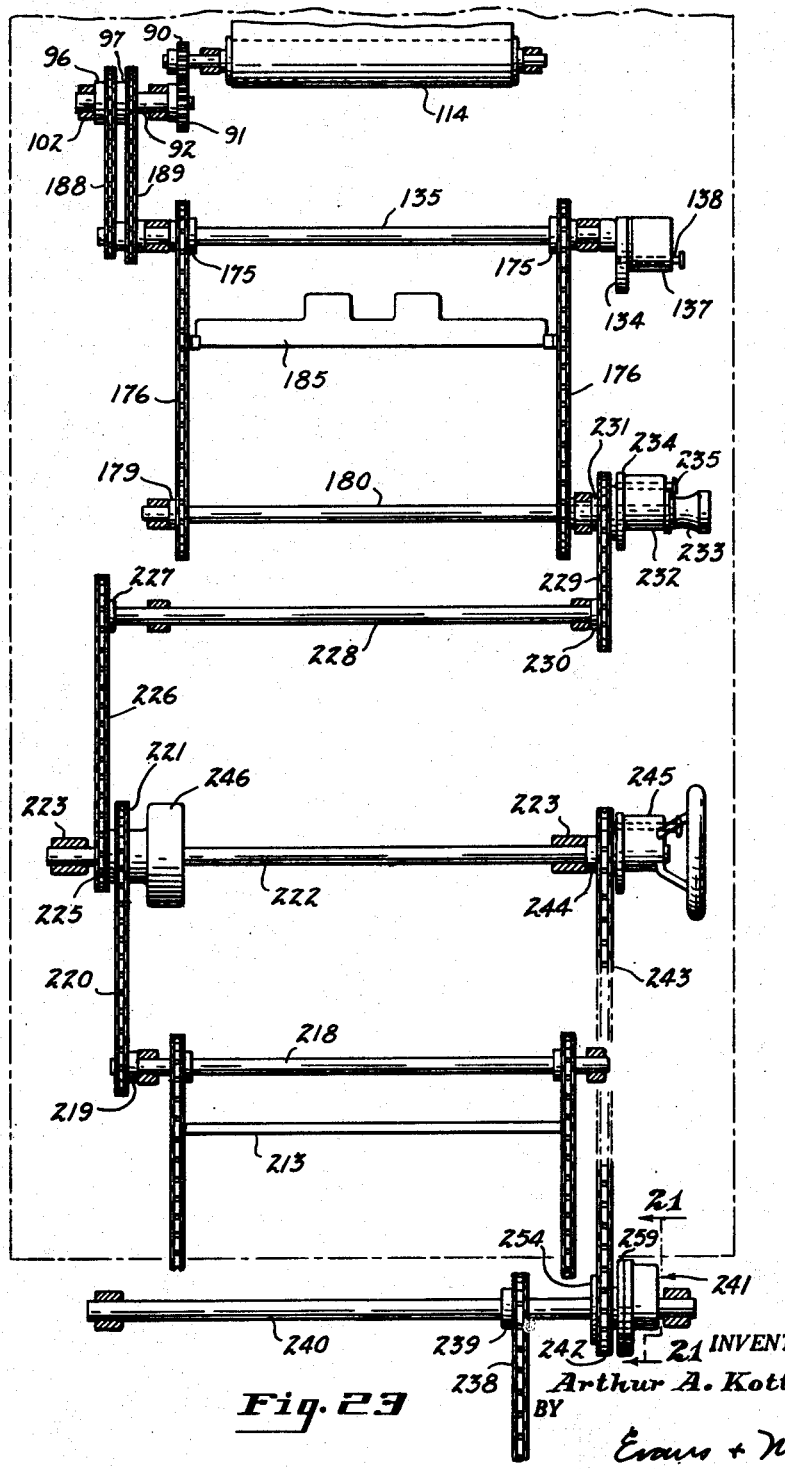

Patented Mar. 24, 1953

2,632,551

UNITED STATES PATENT OFFICE 2,632,551

ARTICLE HANDLING AND TRANSFER APPARATUS

Arthur A. Kottmann, Davenport, Iowa, assignor to The Bettendorf Company, Bettendorf, Iowa, a corporation of Maryland Application April 10, 1947, Serial No. 740,542

7 Claims. (Cl. 198—27)

This invention relates to article handling apparatus and more particularly to apparatus of such character for use in processing or advancing articles of food such as bread loaves into and through a slicing machine.

In the handling of bread loaves and similar articles in present day food processing plants or bakeries, speed and accuracy have become of considerable importance. These objectives must be attained, however, without sacrifice in the quality of the finished product and with a minimum of labor and hazard to the worker. The slicing of baked loaves prior to the packaging thereof is being accomplished with increased accuracy and speed by the use of endless band blade type machines of the type shown, for example, in my prior Patent 2,379,911, issued July 10, 1945. The present invention aims to provide a generally improved article handling apparatus particularly suited to continuous band blade bread slicing machines of the character identified in the patent referred to.

The downward inclination of the infeed or loading conveyor of such a machine provides an arrangement in which gravity assists the movement of the articles and is desirable in certain applications. It is sometimes desirable, however, to provide a flat or horizontal loading conveyor onto which articles may be initially deposited by the operator and from which the articles are thereafter metered through an escapement or shuttle device for movement, one at a time, into other article advancing mechanism. In such applications it remains desirable, nevertheless, to provide for gravity assisted movement of articles off the loading or infeed conveyor and into the shuttle carrier or escapement and the present invention seeks to provide such an arrangement.

In a mechanism for advancing articles and which includes an endless belt infeed or loading conveyor and a flight type conveyor in combination with a shuttle or escapement for transferring articles one at a time from the infeed conveyor to the flight conveyor, it becomes expedient to vary the speed of the belt type infeed conveyor with respect to the flight cycle of the flight conveyor so that the apparatus can be adjusted to accommodate articles of different sizes with a minimum of slippage of the articles on the infeed conveyor. The present machine provides for variation of the speed relationship between the conveyors and utilizes relatively constant cyclic speed for the flight type forwarding conveyor and adjustable drive connection for actuating the infeed or loading conveyor from the forwarding conveyor so that the loading conveyor may be operated at any one of several speeds. The adjustment of the apparatus for articles of different sizes provided for herein also includes alteration in the relationship between the movement of the article carrier or shuttle of the escapement means and the position of the flights of the flight type forwarding conveyor.

Among the numerous improvements that have been incorporated in the apparatus of the present invention are: an infeed or loading conveyor so mounted as to be swingable from an operative position in which it bridges the space between separated members of the supporting frame structure to an inactive position in which it is removed or withdrawn from the vicinity of the working mechanism of the machine so that access may be had to the latter for repair and adjustment; an arrangement for actuating the infeed conveyor so that it is automatically connected to the drive means when the conveyor is moved to bridging position between the frame parts and so that the driving connection is automatically interrupted when the conveyor is withdrawn or swung away from bridging position; an adjustable stop disposed in the path of articles received on the shuttle carrier from the discharge end of the infeed or loading conveyor, the stop being mounted on the structural frame of the machine and being arranged for adjustment to accommodate articles of different sizes while the conveyor and shuttle are in continuous operation; an improved booster roller arrangement positioned at the discharge end of the infeed conveyor between the latter and the reciprocating article intercepting gate which interrupts the movement of the articles off the end of the loading conveyor while the shuttle carrier is transferring the preceding article away from the loading conveyor and into the article advancing mechanism of the apparatus; an improved stationary cross support mounted in the bight or space between the booster roller and the end rotatable element of the infeed conveyor and having lateral fingers which extend through recesses in the booster roller to improve the article transfer characteristics of the device; means for raising an article off the relatively rapidly moving booster roller and out of frictional engagement with the latter while the gate is in article arresting position across the discharge end of the loading conveyor; an improved arrangement for mounting the drums about which are trained the endless cutter bands, including means for adjusting one of a pair of band supporting drums toward and away from the other either by bodily shifting of the rotational axis of the drum in a lateral direction or by shifting of one or both ends of the drum toward or away from the other drum; and an arrangement associated with the drum adjustment providing for a "factory setting" of the blade tension so that in normal use of the apparatus in the field the optimum setting of the blade tension is not ordinarily exceeded even though the blades may be loosened or slackened for cleaning, replacement, and adjustment, the blade tension adjustment permitting alteration of the "factory setting" in the field by relatively simple manipulation of the parts, if such action becomes necessary, as in the replacement of an entire set of band blades.

Still further objectives of the invention are to provide a generally improved article handling apparatus, particularly adapted for use in connection with bread slicing machines, to simplify such apparatus in design and construction, and to make it relatively inexpensive to manufacture. Other objects and advantages of the invention relating to features of construction and arrangements of parts will become apparent from the following detailed description of a preferred embodiment thereof. This description is made in connection with the accompanying drawings wherein like parts throughout the several views are indicated by the same numerals of reference.

In the drawings:

Fig. 3 is a detail of the upper blade supporting drum and the mounting means therefor, partly in section and with parts broken away or removed, the section being taken substantially on the line 3—3 of Fig. 1 and enlarged with respect to that figure;

Fig. 4 is an elevational detail, partly in section of the upper left-hand end of the machine as viewed in Fig. 1 and enlarged with respect to that figure, showing one end of the upper blade drum and the supporting and adjusting mechanism therefor;

Fig. 5 is a fragmentary detail, partly in section and with parts removed, showing the mechanism for manual rotation of the upper blade drum, the section shown being taken substantially on the line 5—5 of Fig. 4 and the crank added;

Fig. 6 is a fragmentary top plan view of the apparatus, with parts broken away or removed, showing the swingable loading or infeed conveyor. This view is taken substantially on the line indicated at 6—6 of Fig. 1 and enlarged with respect to that figure;

Fig. 7 is a fragmentary side elevational view, partly in section and with parts broken away or removed, corresponding to Fig. 1 and showing the infeed or loading conveyor in raised position;

Fig. 8 is a sectional detail showing the latch for the infeed conveyor prop as taken substantially on the line 8—8 of Fig. 6 and enlarged with respect to that figure;

Fig. 9 is a fragmentary vertical section, with parts removed and with parts broken away, taken through the discharge end of the loading conveyor substantially on the line 9—9 of Fig. 6 and enlarged with respect to that figure;

Fig. 10 is a sectional detail taken substantially on the line 10—10 of Fig. 6 and enlarged with respect to that figure;

Fig. 11 is a fragmentary elevational view, partly in section and with parts broken away or removed, showing the upper left-hand end of the apparatus as viewed in Fig. 2 and enlarged with respect to that figure;

Fig. 12 is a foreshortened fragmentary transverse sectional view through the upper portion of the apparatus taken substantially on the line 12—12 of Fig. 11.

Fig. 13 is a fragmentary longitudinal sectional view through a portion of the machine, with parts broken away and parts removed, taken substantially on the line 13—13 of Fig. 12;

Fig. 14 is a fragmentary detail in section through the adjusting mechanism for the article arresting stop, this view being taken substantially on the line 14—14 of Fig. 13;

Fig. 15 is a sectional detail showing the friction brake on the article stop adjustment, taken substantially on the line 15—15 of Fig. 14;

Fig. 16 is a sectional detail through the cam drive for the article arresting gate, this section being taken approximately on the line 16—16 of Fig. 1;

Fig. 19 is an enlarged sectional detail with parts broken away and removed showing the overload release for the shuttle carrier. This view is taken substantially on the line indicated at 19—19 of Fig. 11 and enlarged with respect to that view;

Fig. 20 is a section in detail to the blade tension adjusting means, taken substantially on the line indicated at 20—20 of Fig. 4 and enlarged with respect to that figure;

Fig. 21 is an end view of the overload release device with parts broken away and parts removed taken substantially on the line 21—21 of Fig. 23 and enlarged with respect to that figure;

Fig. 22 is a sectional detail of the overload release taken substantially on the line 22—22 of Fig. 21, and Fig. 23 is a diagrammatic plan view showing the driving connections of the apparatus.

Figure 1:
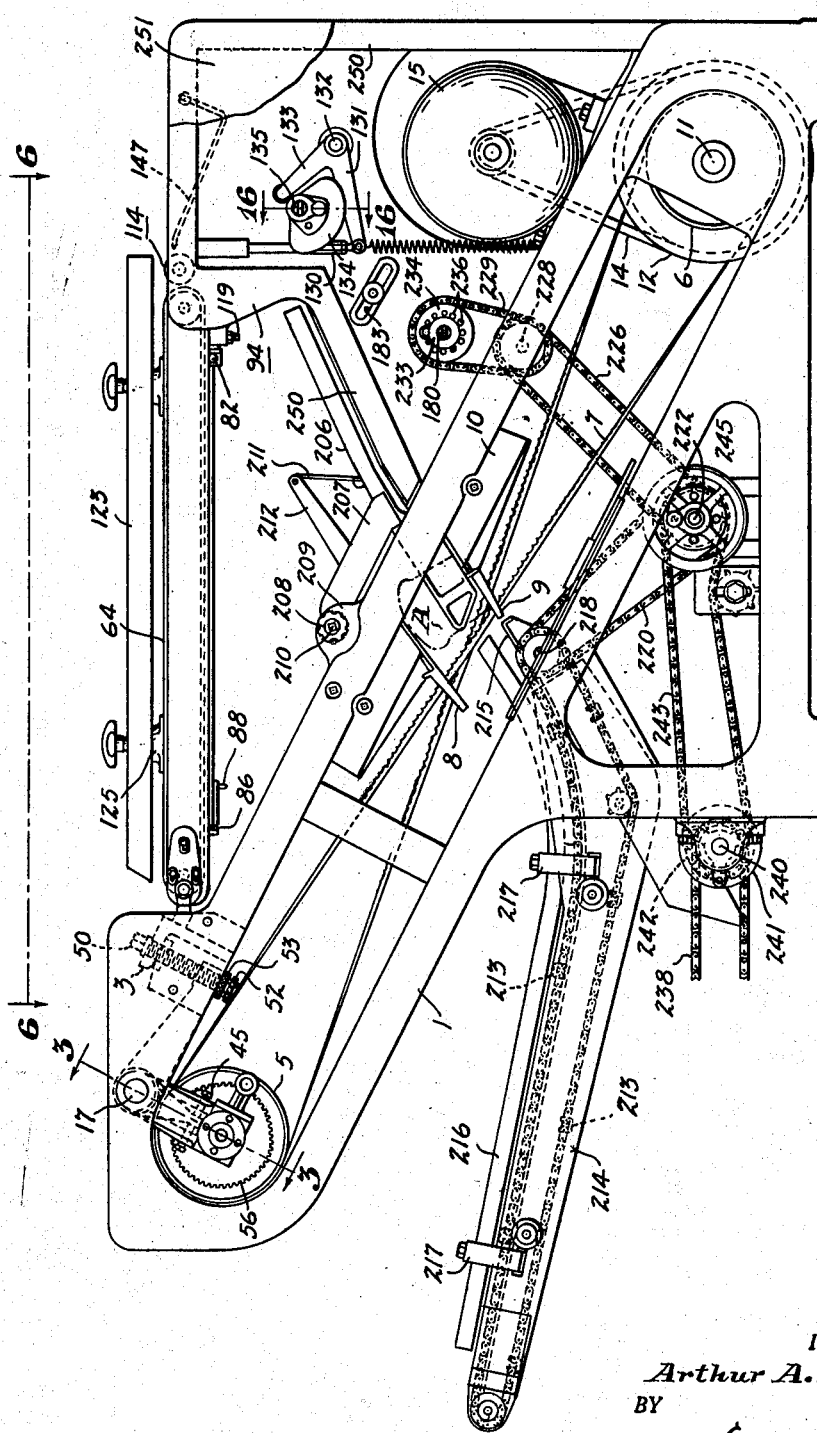
Figure 1 is a side elevational view, with parts omitted and parts broken away, of a bread slicing machine of the endless cutter band type and incorporating article handling and forwarding apparatus embodying the present invention.

The apparatus is assembled as a unitary machine which includes a supporting structure comprising a pair of main side frames 1 and 2 disposed in spaced generally parallel relation and connected by cross members, one of which is indicated at 3 (Fig. 4), secured in place by bolts 4 threaded into the side frames. The side frames are formed with upwardly inclined elements so that the right-hand end of the structure, as viewed in Fig. 1, is lower than the left-hand end. A pair of spaced rotatable drums 5 and 6 are mounted between the upper and lower ends respectively of the side frames and support in side by side relation a multiplicity of crossed endless cutter bands 7.

Midway between the drums 5 and 6 the individual runs of the endless band cutters are engaged by upper guide fingers 8 and lower guide fingers 9 of a suitable spacing mechanism which may be an adjustable spacing mechanism such as that disclosed in Patent 2,316,200, issued April 13, 1943. The spacing mechanism is mounted in a subframe 10 which is supported between the side frames 1 and 2.

The lower blade drum 6 is journaled on a shaft 11 and is supported in the side frames so that the drum is rotatable about a substantially horizontal axis. A pulley or sheave 12 secured on the drum 6 at one end of the latter receives a drive belt 14 which is carried around the drive pulley of an electric motor 15. Energization of the motor thus actuates the lower drum 6 which drives the cutters 7. The ascending and descending runs of the cutters move in opposite directions through the guide fingers 8 and 9 to slice articles such as bread loaves, one of which is indicated at A (Fig. 1), advanced seriation therethrough by the mechanisms to be described.

Drum mounting

A considerable tension is maintained in the endless cutters 7 to insure a positive drive thereof and to avoid excess play which could result in whipping and possible overlapping of adjacent blades. Since the cylindrical drums 5 and 6 are customarily made of steel and the cutter blades 7 are of a high quality spring steel, it is necessary to provide for precise adjustment of the spacing between the drums and to maintain their axes as nearly parallel as possible. In the present machine the lower drum 6 is mounted in fixed position and the upper drum 5 is made adjustable so that it can be moved bodily toward and away from the lower drum in varying the tension in the cutters 7, and either end of the upper drum may be individually shifted toward and away from the lower drum for adjustment to maintain parallelism between the drum axes.

The upper blade drum 5 is suspended by an arrangement shown to advantage in Figs. 3 and 4. The suspension includes a cross bar or rod 17, the ends of which are received in aligned sockets 18 formed in bosses 19 integral with the upper ends of the side frames 1 and 2. Arms 20 depend from the ends of the rod 17 and have sleevelike hubs 21 which are received on the rod and abut the bosses 19 of the side frames. One of the suspension arms 20 is secured on the rod 17 as by a setscrew 22, the other arm being rotatable on the rod. These arms 20, which are disposed at the opposite ends of the upper drum, may be made of steel casting molded in identical form. In assembling the castings in the machine, however, the left-hand arm, as viewed in Fig. 3, is finished differently from the right-hand arm of the same figure. Each arm is formed with an enlarged end 23 which carries one of the stub shafts for mounting the drum. The right-hand arm suspension carries a stub shaft 24 received in a bore 25 formed in the enlarged end 23 and secured in place as by a setscrew 26. The stub shaft 24 has a reduced diameter end portion 27 which is slidingly received in an axial bore 28 formed in main shaft 30 of the drum. The shaft 30 is held on the end 27 of the stub shaft and in abutment with the circumferential shoulder at the end of the reduced diameter portion 27 by an axial bolt 31 which extends through the stub shaft 24 and is threaded into the main shaft 30. Thus, the main shaft is prevented from axial movement so long as the bolt 31 is in place.

Reduced diameter ends on the main shaft 30 receive ball bearing assemblies 32 which are secured in spiders 33 mounted inside the ends of the upper drum 5. The drum thus rotates on the main shaft 30, the latter being held against rotation as by a key 34 set into the reduced diameter end 27 of the stub shaft 24 and having a head which is received in a cutaway portion in the end of the main shaft.

The large end 23 on the left-hand suspension arm 20 (Fig. 3) is formed with an internal bore 25 which receives an externally threaded retractive stub shaft 35. This stub shaft has a reduced diameter end portion 36 which corresponds to the reduced diameter end 27 of the right-hand stub shaft and is slidingly received in axial bore 28 in the left-hand end of the main shaft. The threads on the stub shaft 35 have flat crests which slide and have bearing engagement against the walls of the cylindrical bore 25 in the suspension arm 20.

To shift the threaded stub shaft axially in the end of the arm, a suitable tool or crank (not shown) is inserted in an axial socket 37 formed in the outer end of the stub shaft and having a cross pin therein. Rotation of the stub shaft in this manner (preferably only after relieving the tension in the bands 7) results in endwise movement thereof by reason of the engagement of the threads in a threaded nut 38 secured by cap screws 39 on the outer face of the enlarged end 23 of the suspension arm. When the threaded stub shaft 35 is withdrawn from the bore 28 at one end of the main drum shaft 30, the drum is supported cantilever fashion on the stub shaft 24. When so supported, the endless cutter bands 7 may be removed from and replaced on the drum over the left-hand end as viewed in Fig. 3. This arrangement facilitates the removal of the bands for sharpening or for replacement of the bands by a new set, a similar retractable stub shaft being provided for the lower drum 6. When the threaded stub shaft 35 is projected into the bore 28 of the main drum shaft, the latter is firmly supported at both ends and is swingable about the axis of the crossbar 17.

The swinging movement or angular position of the drum suspension arms 20 on the crossbar 17 is controlled by a hollow member or quill 40 which is rotatably received over the crossbar 17 in telescopic relation thereto. The ends of the quill member 40 are received and supported on reduced diameter portions 41 of the sleeves 21 of the arms 20 and abut the circular shoulders on the sleeves to space the sleeves along the crossbar 17.

Laterally extending levers 43 are formed on the ends of the quill member 40 in spaced parallel relation to one another and are each received in recesses 44 formed in the inwardly directed faces or sides of the drum suspension arms 20. The extremities of the levers 43 are disposed adjacent the enlarged ends 23 of the suspension arms and are engaged on opposite sides by aligned adjusting screws 45 threaded through the walls of the arm recesses 44. By loosening one of the pair of adjusting screws 45 and tightening the other of the pair in either of the drum suspension arms 20, the relative rotative position of the suspension arm with respect to the lever 43 associated therewith can be adjusted. Thus, by means of the adjusting bolts 45, either end of the upper drum 5 can be shifted toward and away from the bottom drum 6 to vary the relationship between their axes. If desired, both ends of the upper drum may be shifted toward and away from the lower drum by means of the adjusting bolts 45 to thereby vary the tension in all of the cutter blades.

The cross member or quill 40 is restrained against rotation to thereby prevent swinging movement of the blade suspension arms 20 by means of an integral arm 46 which extends laterally from a central portion of the quill approximately midway between the end levers 43. The end of the arm 46 is formed with a transverse threaded bore which receives a bearing stud 47. The end of the stud is engaged endwise by an adjusting screw 48 threaded through a central portion of the cross member 3 of the frame supporting structure. By threading the adjusting screw 48 into or out of the cross member 3, the central arm 46 of the quill member may be made to rotate slightly about the cross bar 17 thereby imparting a lateral shifting of the upper drum 5. This lateral shifting of the drum operates to increase or decrease the tension in the cutter bands 7.

Blade tension adjustment

It has been found that endless band blade slicing machines of the character contemplated herein operate most satisfactorily when the individual cutters are maintained at a certain optimum tension. When slicers of this type are released for commercial use with means provided for varying the blade tension, it frequently happens that inexperienced or uninformed operators will fail to provide sufficient tension in the cutters or, what is more objectionable, will increase the tension in the blades to an excessive amount. It is, nevertheless, necessary to provide for releasing the blade tension so that cutter bands can be removed and replaced in the machine as they become worn or broken.

The blade tension adjustment of the present invention permits the tension in the individual cutters to be pre-established when the machines are initially assembled. Such "factory setting" of the blade tension is not then readily increased in the field by inexperienced operators. The adjusting screw 48 has a square head 50 to receive a suitable tool for turning it in adjusting the blade tension. At the base of the head 50 is a circular flange 51 which is provided with a finished shoulder which seats against a spot face formed about the threaded bore in the cross member 3 which receives the adjusting screw. In initial assembly of the machine at the factory the blade tension is adjusted, with the screw 48 tightened down so that the flange 51 thereof sets against the cross member 3. Thereafter, withdrawal of the adjusting screw 48 releases the tension in the blades for repair, resharpening, or replacement of the latter, and in tightening the screw 48 to readjust the blade tension it cannot be increased beyond that established by the "factory setting."

The "factory setting" of the blade tension may be done by means of the adjusting screws 45 previously mentioned in connection with the drum suspension arms 20. A preferable adjustment is by means of the bearing stud 47 which can be screwed or shifted axially in the threaded recess therefor in the end of the arm 46. At its end opposite that of the adjusting screw 48 the stud 47 is formed with a head 52 (Fig. 20) of circular shape and is formed with peripheral notches for engagement by a spanner wrench or with coded holes that can be engaged for turning by a special wrench (not shown). Such a wrench is in use during initial assembly of the machine and (as shown in Fig. 4) the close proximity of the runs of the cutters 7 discourages the use of any other implement to change the setting of the bearing stud 47.

Between the stud head 52 and the end of the arm 46 a knurled nut 53 is received on the threaded stud. This nut is normally held against rotation by setscrews 54. At the time of the initial assembly of the machine, the adjusting screw 48 is tightened down so that the collar 51 thereof is disposed against the spot face of the machine cross member 3. The blade tension is then adjusted and the "factory setting" established by turning the bearing stud 47 to provide the desired tension in the cutters 7. Thereafter, the knurled locking nut 53 is positioned on the bearing stud so as to permit a predetermined additional rotation thereof, such, for example, as one turn. The setscrews 54 are then tightened to lock the knurled nut 53 in adjusted relation to the stud head 52. In this condition the machine is released to the trade.

In normal maintenance and service of the machine the operator cannot increase the tension in the cutter blades by manipulation of the adjusting screw 48 beyond that established in the "factory setting." To provide slight additional drum movement, as when a substitute set of blades is supplied, the bearing stud 47 can be given the predetermined single revolution provided for in the "factory setting" by means of the spanner wrench or special tool provided for turning the stud head 52. Such wrench or special tool is normally kept in the possession of a responsible individual at the place of use and is not made available to all the regular operators of the machine.

If still further blade tensioning movement is required, the setscrews 54 are released and the position of the knurled nut 53 on the bearing stud 47 is changed. By this arrangement the manufacturer is able to minimize unskilled tampering with the "factory setting" of the machine while permitting a limited amount of tension adjustment such as may be required under special circumstances.

Manual drum rotation

In adjusting the cutter bands 7 or in replacing worn cutters with a new set of bands, it is convenient to rotate the drums 5 and 6 at slow speed or manually. The upper drum 5 is fitted with a gear 56 positioned inside the left-hand end (as viewed in Fig. 3) and secured to one of the spiders 33 by cap screws 57. A turning bar or rod 58, insertable axially into the end of the drum, is formed at one end with gear teeth 59 which mesh with the teeth of the gear 56. The bar 58 is of sufficient length to extend from the drum gear 56 out through the side frame 1 and is formed at its outer end with a turning crank 60 by means of which the rod can be rotated manually to drive the drum. The annular space between the inside of the drum shell and the teeth on the gear 56 is just sufficient in radial depth to receive the toothed end of the rotatable rod and to hold the gear teeth in mesh. A sleeve bearing 61 formed on a bracket 62 secured to the end of the drum suspension arm 20 slidingly receives the rotatable rod 58 to support the latter as it is turned to rotate the drum. When not in use, the rod 58 is withdrawn axially to disengage the gear 59 from the drum gear 56 and is removed from the machine through the sleeve 61.

Loading conveyor

Articles such has bread loaves to be processed in the machine of the present invention are deposited by the operator on a driven loading or infeed conveyor of the endless belt type. This conveyor is at the top of the machine and comprises an endless flexible belt 64 which may be of rubber, fabric, or woven metal screen construction. The belt is carried by end rotatable members or cylinders 65 and 66 which are secured on shafts 67 and 68 respectively. The shafts are rotatably mounted in aligned sleeve journals 69 formed transversely on the ends of threaded rods 70. These rods are disposed at right angles to the shafts supported thereby and are received in openings formed in the two end cross members 71 and 72.

The cross members 71 and 72 are secured as by screws 74 threaded into the ends of the members to depending flanges 73 (Fig. 10) of infeed conveyor apron 75 which extends throughout the length of the infeed conveyor and underlies the upper run of the endless belt 64. The threaded rods 70 which carry the journals for the conveyor shafts each receive nuts 76 which are tightened against opposite sides of the end cross members 71 and 72 of the conveyor. By altering the positions of the nuts 76 on the several threaded rods, the relative positions of the axes of the conveyor rotatable members 65 and 66 can be adjusted and the distance between the rotatable members can be altered to vary the tension in the endless belt 64.

At its infeed end the loading conveyor is pivotally supported by bolts 79 rotatable in brackets 78 secured to the cross member 3 of the main supporting structure. The pivot bolts 79 are aligned with one another and threaded into support elements 80 secured to the ends of the apron side flanges 73 and the cross member 71. By this arrangement the loading conveyor may be swung about the horizontal axis of the pivot bolts 79 between its normal substantially horizontal position (shown in Figs. 1 and 2) and raised position (shown in Fig. 7). In the latter position the raised conveyor permits ready access thereunder to the article advancing mechanism of the machine and to the blades and blade spacing mechanism.

The support elements 80 are formed with elongated slots to receive the attaching bolts and screws which secure them in place. This slip-joint arrangement permits the loading conveyor to be shifted bodily in a longitudinal direction and the discharge end can be shifted laterally for adjustment with respect to certain companion mechanism including a booster roll 114, a gate 127, and bars 147 of a carrier or article transfer device to be later described. Dimensional pile-up due to matching finished and unfinished surfaces in the final assembly of the machine is also compensated for in this slip-joint.

Figure 2:
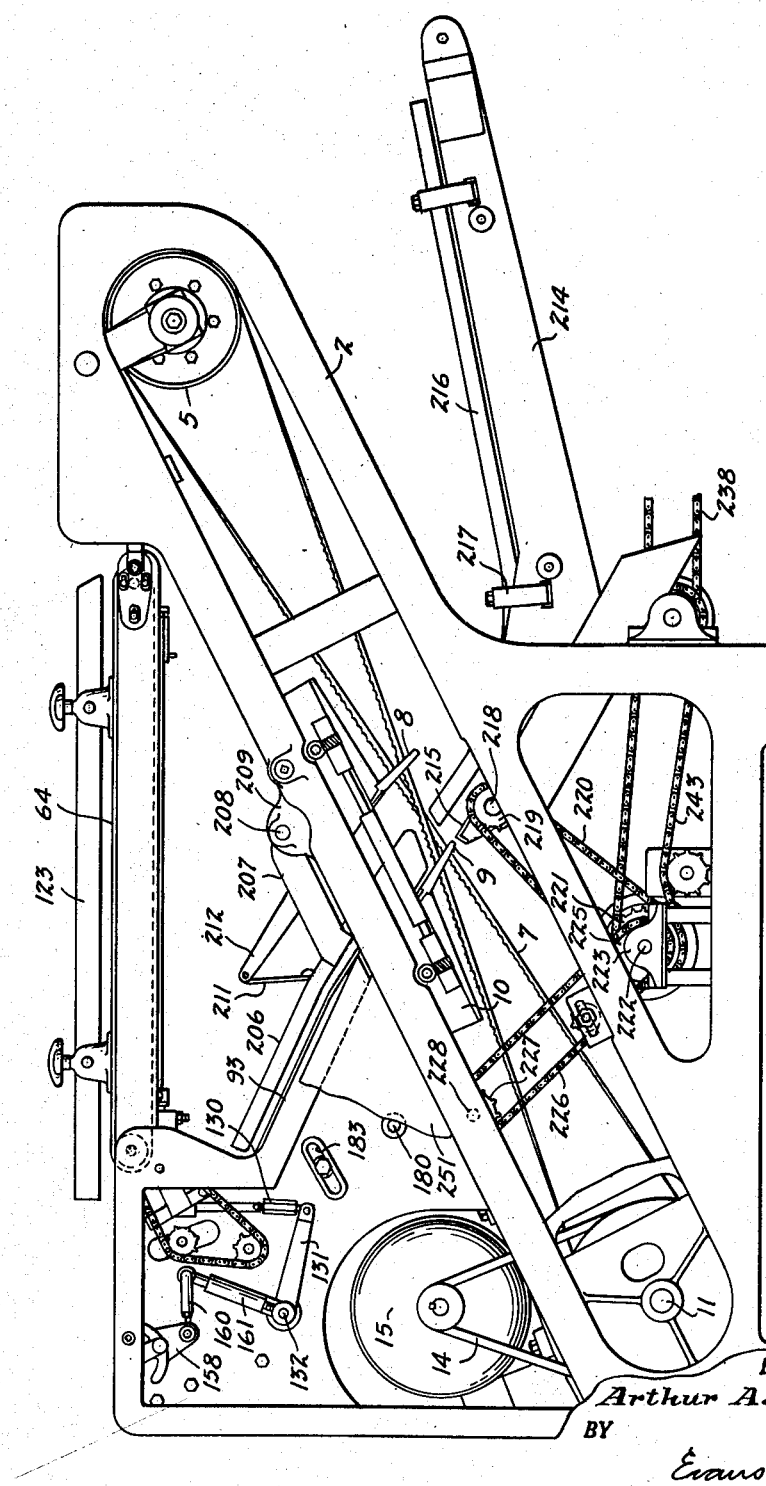
Fig. 2 is an elevational view of the opposite side of the machine of Fig. 1, parts of the machine being omitted and parts broken away.
Figure 17:
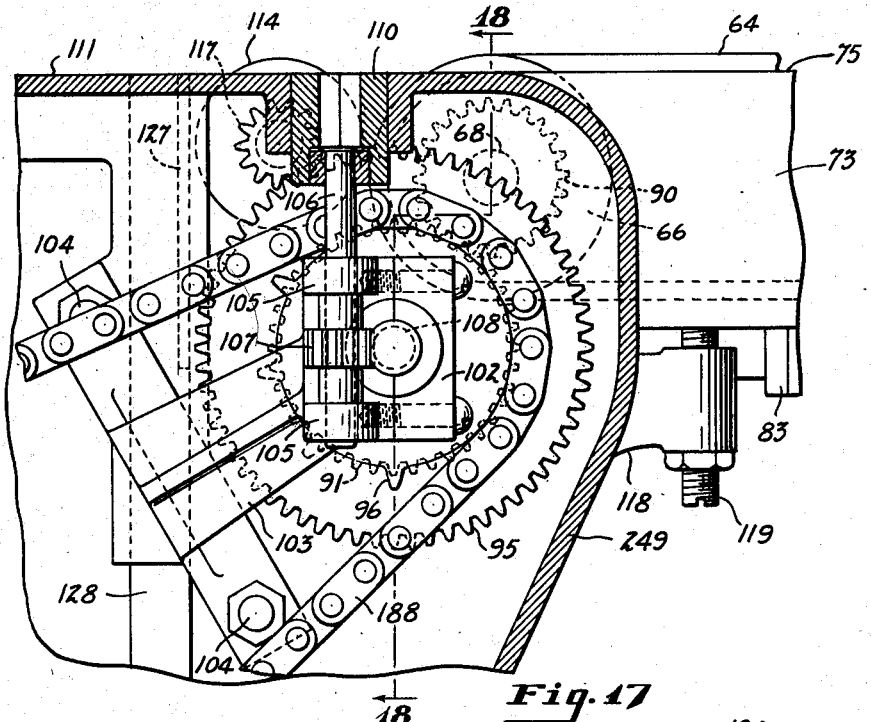
Fig. 17 is a fragmentary elevational detail partly in section, showing the connections between the main drive of the article advancing mechanism and one of the rotatable elements of the endless belt infeed conveyor. This view is taken substantially on the line indicated at 17—17 of Fig. 18, or the line 17—17 of Fig. 6, being enlarged with respect to the latter figure.

To support the conveyor in raised position a pivoted or hinged prop 81 is secured to a cross rod 82, the ends of the latter being loosely received for rotation in journal brackets 83 secured to depending ears formed on the ends of the cross member 72. The prop 81 is secured as by welding to the center of the cross rod 82, the latter being rotatable in the brackets in moving the prop 81 from its retracted position (shown in Figs. 1 and 2) to its extended position (shown in Fig. 7). Cotter pins 84 retain the rod ends in the pivot brackets 83. To hold the prop 81 in raised position the lower end thereof carries a spring pressed plunger 85 (Fig. 8) receivable in a recess formed in a cross member 86 which is supported between depending ears 87 formed on the ends of the conveyor cross member 71. The plunger 85 has a finger lift 88 connected thereto by means of which the plunger can be withdrawn from the detent recess in the member 86 so as to release the prop 81, permitting the prop to be lowered to its conveyor supporting position. When in its lowered position, the prop 81 rests on the conveyor apron 174 and a hole in the latter receives the plunger 85 to retain the prop in correct position. Thus the plunger or finger 85, by engagement in the apron, prevents the prop from being accidentally dislodged when it is supporting the conveyor in raised position. The prop 81 also serves, when in raised position as shown in Figs. 1 and 2, as a support for the bottom run of the endless flexible belt 64. Thus the prop prevents sagging of the belt and keeps it out of the way should the operator find it necessary to have access to the forwarding conveyor during operation of the machine.

Figure 18:
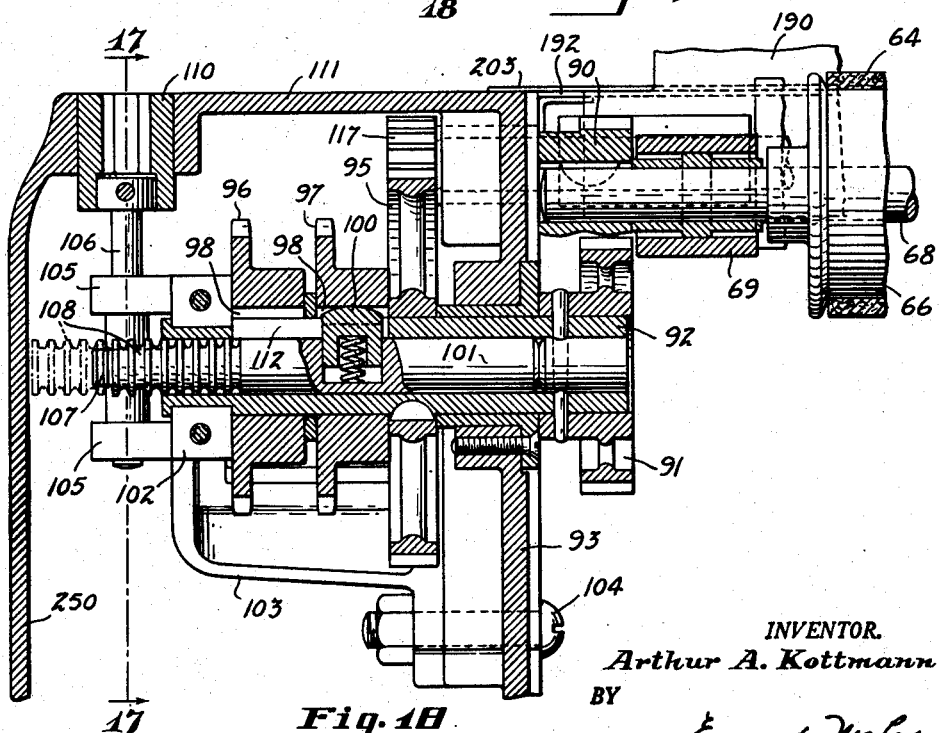
Fig. 18 is a fragmentary sectional detail with parts broken away taken substantially on the line indicated at 18—18 of Fig. 17.

To drive the loading conveyor the shaft 68 carrying the conveyor rotatable element 66 is extended through one of the journal sleeves 69 at the discharge end of the conveyor and has a driven spur gear 90 keyed thereto. This gear is so positioned as to mesh with a drive gear 91 secured on a hollow shaft 92 journaled in a supplemental side frame 93 (Fig. 18). The frame member 93 and another supplemental side frame 94 are disposed in spaced parallel relation and are carried by the main side frames. The upper ends of the main side frames 1 and 2 and the upper ends of the supplemental side frames 93 and 94 are disposed in spaced relation with respect to one another, as shown in Figs. 1 and 2, and the loading conveyor serves to bridge the space between the separated upper ends of the frame members of the supporting structure. The hollow shaft 92 extends through the frame member 93 and carries a gear 95 which is keyed in place and is larger in diameter than the gear 91.

Adjacent the gear 95 the shaft 92 also carries a pair of clutch sprockets 96 and 97 in side by side relation. While the gears 91 and 95 are secured on the hollow shaft 92 as by pins or keys for rotation therewith, the clutch sprockets 96 and 97 are individually rotatable on the shaft. Each of the clutch sprockets is formed with a keyway 98 into which may be moved a spring pressed traveling key 100 carried in an axially movable rod 101 slidable endwise in the hollow shaft 92. The outer end of the shaft 92 is supported in a journal 102 in a bracket 103 secured to the supplemental frame 93 as by bolts 104. The shaft journal 102 serves to retain the clutch sprockets on the hollow shaft and is formed with extension ears 105 in which is journaled a vertical shaft 106 carrying a gear 107 which meshes with circular teeth 108 formed on the rod 101. The upper end of the vertical shaft 106 is formed to fit and is pinned in a mating recess formed in the bottom of a rotatable socket element 110 journaled in a laterally extending integral top flange portion 111 of the supplemental side frame. The rotatable element 110 has a non-circular recess to receive the end of a crank for turning the element so that shaft 106 may be rotated to thereby move the slidable rod 101 axially into and out of the hollow shaft 92. The key 100 carried by the slide rod 101 is formed with a sloping crown and tapered side edges so as to facilitate moving it into and out of the keyways 98 formed in the clutch sprockets. Thus the hollow shaft 92 may be driven by either the sprocket 96 or the sprocket 97, depending upon the position of the traveling key 100. This key extends through an axial slot 112 formed in the hollow shaft 92, and in the position shown in Fig. 18 the key is arranged to establish a driving connection between the shaft and the sprocket 97.

Booster roller

Extending across the space between the supplemental side frames 93 and 94 at the top of the structure is a rotatable member or booster roller 114. This roller is arranged to receive articles moving off the discharge end of the loading conveyor and thus may be said to be located at the infeed station of the mechanism. The roller is a composite device formed of a number of fiber, rubber, or wood spools 115 secured on a shaft 116 journaled at its ends in the supplemental side frames 93 and 94. One end of the shaft 116 extends through the top of the supplemental side frame 93 and has a gear 117 secured thereon and meshed with large gear 95 carried by the hollow shaft 92. The gear 117 is smaller than the gear 90 of the loading conveyor while the gear 91 which drives the loading conveyor is of less diameter than the gear 95 which drives the booster roller. This gear arrangement effects a relatively high speed drive of the booster roller 114 as compared to the speed of the loading conveyor. For example, in the arrangement illustrated in the drawings the peripheral speed of the booster roller is about three times the peripheral speed of the driven rotatable element or cylinder 66 of the loading conveyor.

The discharge end of the loading conveyor is adjustably supported on brackets 118 (Figs. 9 and 13) secured on the inside of the supplemental side frames 93 and 94 and formed with lateral extensions which are fitted with screw posts 119 that can be raised and lowered in the brackets for adjustment and which engage the underside of the end cross member 72 of the loading conveyor. The upper run of the conveyor belt 64 is aligned with the booster roller 114 automatically each time the conveyor is lowered after having been raised to provide access to the mechanism so that articles can move readily from the belt onto the roller. A cross element 120 is positioned in the bight between the conveyor rotatable member 66 and the booster roller 114 to support articles moving therebetween. This cross element underlies extension portions of the conveyor apron 75 at the ends of the rotatable element 66 and is secured in place by screws 121 which extend through the apron and are threaded into the cross element.

As shown in Fig. 6, the spools 115 are axially separated from one another providing spaces which receive laterally extending fingers 122 of the cross element 120. These lateral extensions insure the support of articles moving onto the booster roller from the loading conveyor.

The cross element 120 also prevents soft articles, such as extremely moist bread loaves, from being pulled down between the endless feed belt 64 and booster roll 114. This supporting action of the cross element 120 and the fingers 122 is especially desirable in the case of articles which are not lifted off the booster roll by the fingers 144 later described. In such case the article remains on the end of the loading conveyor and the booster roll while the latter are moving under power. Without the cross support element 120 and the fingers 122, articles like round or oval sectioned rye or Vienna loaves not lifted off the belt and booster roll by fingers 144 would be subject to being drawn down between the conveyor belt and the booster roll, or between the booster roll and the article arresting gate 127.

Along one side of the loading conveyor is a guide rail 123 which is engageable with the ends of articles placed on the loading conveyor to guide the movement of the articles onto the booster roller. The guide 123 is secured on the ends of rods 124 adjustably mounted in brackets 125 which permit the guide 123 to be moved laterally over the conveyor belt 64 for proper positioning of the articles thereon.

Article intercepting gate

Alongside the booster roller 114 is mounted a vertically reciprocable gate 127 which is disposed to intercept articles moving off the loading conveyor and across the booster roller. This gate may be in the form of a substantially flat plate which is secured at its ends to spaced vertical slide members 128 guided for up and down endwise movement in recesses 129 formed in the inner faces of the supplemental side frames 93 and 94. The lower ends of the slides 128 are connected by adjustable length links 130 to the ends of levers 131 secured on a cross shaft 132 journaled in the supplemental side frames. An arm 133 extending from one of the levers 131 has a roller journaled on its end which follows or rides on the periphery of a cam 134 mounted on a rotatable driven shaft 135 journaled in the supplemental side frames of the machine. The follower roller is held against the cam by a helical coil tension spring 126 connected to pivot pin 146 in the end of one of the lever arms 131.

The cam 134 is rotatable to different relative positions on the shaft 135, being restrained against axial movement between a bushing 136 in the side frame 94 and a block 137 secured on the squared end of the shaft 135 by a pin 138. A spring pressed plunger 139, slidable in the block 137 and radially offset from the rotational axis of the shaft on which the block is mounted, is receivable in any one of a number of recesses 140 formed in the cam 134 so as to establish a driving connection between the shaft 135 and the cam. A rod 141 connected to the plunger 139 extends through a threaded bushing in the end of the block 137 so that the operator of the machine can withdraw the plunger 139 and move the cam 134 to a different rotative position on the shaft, after which the plunger is released to interfit in another of the cam recesses 140. In this manner the timing of the movement of the gate 127 is adjusted with respect to the rotation of the shaft 135. This serves to adjust the movement of the gate with respect to the article advancing mechanism, as will later appear. The block 137 is also formed with an axial socket 142 inside of which is a transverse pin 143 that can be engaged by the end of a hand crank for rotating the shaft 135 and thereby moving the gate and the article advancing mechanism manually for adjustment and service.

During the operation of the machine, articles are advanced over the loading conveyor in side by side abutting relation and onto the booster roller 114. With the gate 127 in the lowered position illustrated in Figs. 1, 2, 9, and 11, the leading article is free to move over the booster roller and onto the reciprocable carrier or article transfer device to be later described. The gate 127 remains in lowered position while the cam follower on the arm 133 moves across the low region of the cam 134 (Fig. 1). As the cam is rotated to bring the high portion of the cam under the cam roller, the arm 133 is moved in a clockwise direction (Fig. 1) which raises the arms 131 and thereby lifts the gate 127 to the raised position, shown by the broken lines in Fig. 9 and in full lines in Fig. 13.

The relatively high rotational speed of the booster roller 114 serves to advance each article moving thereover onto the carrier at a sufficiently high rate of speed to separate it from the succeeding article on the loading conveyor. The space thus provided between the leading article and the succeeding article permits the gate 127 to be started upwardly in the clear. Before the gate reaches its uppermost position the next or succeeding article has been moved onto the booster roller 114 from the loading conveyor and a number of laterally extending finger lifts 144 secured along the bottom of the gate 127 engage underneath the front bottom edge of the article to raise the latter off the booster roller, as shown by the broken lines of Fig. 9. This arrangement avoids abrasion and possible injury to the underside of the article by the rapidly rotating booster roller during periods that the article dwells against the stop gate 127. A number of circular grooves 145 may be formed in the spools 115 of the booster roller to accommodate the lift fingers 144 permitting the latter to pass the booster roller in terleaved relation during the up and down movement of the stop.

Carrier

Each article or bread loaf released by the gate 127 is accelerated and moved rapidly by the booster roller 114 and is individually received by an article transfer device or carrier comprising a plurality of spaced parallel rods 147 which are each L-shaped and have the ends of their offset angularly disposed portions 148 secured to a cross member or bar 149 which is mounted horizontally between the supplemental side frames 93 and 94 for reciprocating rotative movement. The ends of the carrier crossbar 149 are received in sleeves 150 (Fig. 19) carried just inside the supplemental side frames on the ends of stub shafts 151 journaled in flanged bushings 152 supported by the side frames. The carrier member 149 and the shafts 151 are secured against rotation in the sleeves 150 by removable pins 153. In case of damage to the carrier it may be readily removed as a unit by withdrawing the pins 153 and sliding the sleeves 150 axially along the carrier bar 149, freeing the ends of the carrier from the stub shafts 151.

Actuation of the carrier is effected through a safety overload release positioned outside the supplemental side frame 93. This releasable drive (Fig. 19) comprises an arm 155 keyed on the outer end of one of the stub shafts 151. The end of the arm 155 carries a spring pressed ball detent 156 which is receivable in a recess formed in the face of a bushing 157 secured in a drive plate or member 158. Hub 159 of this drive plate is rotatably mounted on the stub shaft which carries the arm 155 between the arm and one of the journals 152. The end of the drive member 158 is connected by an adjustable length link 160 to the end of an adjustable length arm 161 secured on one end of the shaft 132 previously mentioned in connection with the article intercepting gate 127. The reciprocating movement imparted to the shaft 132 by the rotation of the cam 134 is thus transmitted to the carrier cross member 149 through the adjustable length arm 161, the drive member 158 and the arm 155, the ball detent 156 establishing a releasable drive connection between the parts.

Spring 162 (Fig. 19) which is axially compressed and retains the ball detent in the bushing 157 is held under compression by a screw 163 which can be moved to different positions in the threaded recess provided therefor in a lateral extension of the arm 155. Thus may be varied the spring compression and the carrier actuating force that can be transmitted through the safety release. Should an overload be applied to the carrier bars 147, as by misalignment of an article or the introduction of foreign material into the article transfer mechanism, the ball detent 156 rides out of the recess in the bushing 157 and during the continued oscillation or reciprocation of the drive member 158 the ball rides back and forth over an arcuate path on lateral extensions 164 (Fig. 11) formed on the drive member 158.

Safety switch

A spring pressed element or rod 166 is slidable axially in the bushing 157 carried by the drive member 158 and extends through the bottom of the recess in the bushing and into engagement with the ball detent 156. The rod 166 is axially aligned with the ball detent and the spring 162 acting on the latter and its outer end is guided in an insulating bracket 167 carried on the inside of the drive member 158. Helical coil compression spring 168, which surrounds the rod element 166 in an enlarged recess in the bushing 157, bears against a collar 169 on the rod and is weaker than the helical coil compression spring 162 which holds the ball detent in position. Thus the rod element 166 is moved against the force in the spring 168 into a retracted position by the ball detent.

A cap 170 adjustably mounted on the protruding end of the rod element 166 overlies and engages plunger 171 of an electric switch 172 mounted on the insulating bracket 167 of the drive member 158. The switch 172 is connected by wires 173 in the electrical circuit which controls the energization of the entire machine or group of machines with which the apparatus of the present invention is used. For example, the switch 172 may be connected in the armature circuit of a master control switch used to energize circuits for all the electric motors driving a combination bread slicing and bread wrapping mechanism including a wrapping machine, a conveyor system for the wrapper, and a slicing machine having a motor such as the motor 15 actuating the endless cutter bands.

If for any reason, such as an overload in the carrier or article transfer mechanism, the ball detent 156 is caused to ride out of the recess in the bushing of the drive member 158, the rod element 166 is released for axial movement by the compressed spring 168 so that the cap 170 engages and depresses the plunger 171 to actuate the switch 172. Such actuation of the control switch de-energizes the armature holding the master control electric switch mentioned, which immediately de-energizes all the electrical power circuits in the machine or combination of machines, preventing injury and damage to the parts. This safety switch arrangement is reset after such a de-energizing action by moving the ball detent 156 back into the recess in the bushing 157. The ball detent engages and shifts the rod element 166 axially releasing the switch plunger 171 so that the master switch armature circuit may be re-energized.

Forwarding conveyor

The articles received by the shuttle carrier or article transfer device are deposited by the bars 147, one at a time, on a forwarding conveyor which moves the articles into and through the slicing mechanism. The forwarding conveyor is of the flight feed type providing an individual pocket for each loaf. In their movement over the forwarding conveyor, advancing articles are supported on a downwardly inclined apron 174 mounted between the supplemental side frames 93 and 94. This apron terminates at its upper end adjacent the driven shaft 135 which carries the cam 134 previously mentioned in connection with the article intercepting gate and the oscillating carrier.

On the shaft 135 just inside the supplemental side frames 93 and 94 are sprockets 175 (Fig. 12) which rotate with the shaft and support and drive a pair of spaced parallel, endless side belts or chains 176. These endless chains have upper runs which extend forwardly in the machine along the sides of the article supporting apron 174 and are trained around and supported by forward sprockets 177 (Fig. 11) carried by stub shafts disposed at the forward end of the conveyor apron at the sides of the latter and supported by conveyor side members mounted inside the supplemental side frames.

The bottom or return runs of the endless side chains are carried under drive sprockets 179 secured on main conveyor drive shaft 180 for rotation therewith. Each of the endless side chains 176 is also carried over an idler sprocket 181 mounted on a stub shaft 182 adjustably mounted in an elongated slot 183 formed in one of the supplemental side frames.

A number of equally spaced article advancing flights 185 are each pivotally connected at their ends to the side chains 176. Rotation of the main conveyor drive shaft 180 thus drives the side chains 176 in synchronism, advancing the flights 185 over the apron 174 of the forwarding conveyor. The flights are supported in upright positions by laterally extending feet which ride along the apron or a track provided therefor. At the discharge end of the forwarding conveyor, the feet of the flights ride off the conveyor apron or track so that the flights can drop downwardly below the level of the apron as the side chains 176 are carried around the forward sprockets 177. The side chains 176 in rotating the upper sprockets 175 which are secured on the shaft 135 thus serve to drive the latter and thereby actuate the cam 134 which moves the article intercepting stop 127 and the carrier bars 147 all in synchronized timed relation.

Conveyor speed control

Movement of the articles on the loading conveyor is periodically interrupted by the intercepting gate 127, the belt 64 sliding under the articles a portion of the time during each cycle. At a given rate of handling articles in the machine, the time required to transfer a relatively narrow article from the loading conveyor onto the carrier is less than the time for a wide article. Accordingly, operation of the loading conveyor belt 64 at a constant speed regardless of the sizes of articles being processed would result in small articles being subjected to considerable abrading action by the loading conveyor belt. This difficulty is largely overcome by providing a change speed mechanism which enables the operator to drive the loading conveyor belt at a relatively high rate of speed when large wide articles are being processed, or to drive the conveyor at a relatively low rate of speed when small or narrow articles are being processed.

The driven shaft 135 has one end that extends through the supplemental frame 94 and mounts the cam 134. Its other end extends through the supplemental frame 93 and mounts sprockets 186 and 187 which are of different sizes and which carry endless chains 188 and 189 trained around the clutch sprockets 96 and 97, respectively, mounted on the hollow shaft 92 previously mentioned in connection with the loading conveyor. Either of the sprockets 96 or 97 may be drivingly connected to the hollow shaft 92 by means of the shiftable or traveling key 100, the sprocket not so connected, merely running idle on the shaft.

While the sprockets 96 and 97 are of the same size, the sprocket 187, being larger in diameter than the sprocket 186, drives the endless chain 189 at a relatively faster rate of speed than the endless chain 188 is driven. Accordingly, if the key 100 is in the position shown in Fig. 18, the loading conveyor apron 64 is driven at a relatively fast rate of speed suitable for handling relatively wide articles or bread loaves. If small articles or loaves are to be handled by the apparatus, the key 100 is shifted to establish a driving connection between the sprocket 96 and the hollow shaft 92. In such case the loading conveyor belt 64 is driven through the endless chain 188 at a relatively slow rate of speed suitable for handling narrow articles or loaves of bread.

Article stop

The carrier bars 147 are oscillated between a receiving position in which they are inclined upwardly toward the discharge end of the loading conveyor, as shown in Fig. 11, and a discharge position in which they are inclined downwardly substantially in alignment with the apron 174 of the forwarding conveyor. Each article deposited on the carrier bars 147 slides along the latter and comes to rest against a stop 190. This stop is formed of a metal plate having an upper portion bent backward at an angle so as to present a substantially flat side to an article, such as a bread loaf, resting on the inclined carrier bars 147.

The stop 190 is adjustable so that it can be advanced or retracted while the machine is in operation to place it in the most advantageous position for the particular size of article being handled. It is secured to a depending flange 191 formed along the forward edge of a shiftable horizontal plate or apron 192 which extends across the top of the machine between the supplemental side frames 93 and 94. The plate 192 is supported by angle members 193 secured to the inside faces of the supplemental side frame members along the top edges of the latter. A pair of racks 194 are secured along the underside of the plate or apron 192 adjacent the edges of the latter and underlie the edges of the horizontal flanges of the angle members 193 so as to hold the apron in place against the angle members for back and forth sliding movement. Extending across the top of the machine beneath the slidable plate 192 is a rotatable rod 195 journaled in the supplemental side frames and having secured thereto pinion gears 196 which mesh with the racks 194. The outer edge of the top flange 111 of the supplemental frame 194 is formed with a depending portion 197 which journals a turning element 198 secured on one end of the shaft 195. The turning element 198 is formed with an internal noncircular or square socket for receiving the end of a suitable turning tool or crank by means of which the shaft 195 can be rotated to advance and retract the racks 194 which shift the article stop 190.

A friction brake 200 (Fig. 15) in the form of a split block embraces the shaft 195 between the supplemental frame 94 and the frame flange 197. The block is tightened on the shaft by a bolt 201 so that the grip of the block on the shaft can be varied. The brake block is restrained against rotation by the top lateral flange 111 of the supplemental frame.

A cover 202 extends across the space between the supplemental side frames 93 and 94 at the end of the machine and is continuous around the upper corner of the machine and onto the top thereof. The top portion 203 of the cover overlaps the movable plate or apron 192 and has sliding engagement therewith. This construction provides a substantially complete enclosure for the article forwarding mechanism of the machine, the supplemental side frames 93 and 94 being imperforate except for the openings therein to accommodate the shafts and rods mentioned. The size of the opening through the top of the machine through which articles move onto the carrier bars 147 is regulated by the shiftable apron or plate 192 so as to be no larger than required. Thus dust and foreign matter is excluded from the interior of the machine to a considerable extent. A cross member 204 extends between the supplemental side frames 93 and 94 and is secured to the latter by bolts 205.

Articles advancing over the conveyor apron 174 are engaged at their ends by adjustable guides 206 carried by arms 207 mounted on oppositely threaded ends of a cross rod 208 journaled in bracket extensions 209 on the main side frames 1 and 2. Rotation of the rod 208, as by a suitable crank or turning tool inserted into a square socket 210 (Fig. 1) formed in one end of the rod, operates to move the guides 206 toward or away from one another in adjusting the apparatus to accommodate articles of different sizes. As the articles are advanced over the forwarding conveyor they are also engaged by a pendant apron 211 pivoted at its upper end for free swinging movement on a rod carried by an article holddown or extension 212 of a guide assembly fastened to the upper blade spacing unit. This apron yieldingly restrains the forward movement of the articles and prevents them from toppling over.

Discharge conveyor

Articles advanced to and through the endless band cutters 7 by the forwarding conveyor are received in sliced form on a discharge conveyor which is of the flight type. The discharge conveyor comprises a pair of spaced parallel beam elements 214 supported cantilever fashion by the main side frames 1 and 2. An article supporting apron 215 extends along the length of the discharge conveyor between the side beam members 214 and has a receiving end which is in alignment with the bottom guide fingers 9 of the spacing and guiding mechanism previously mentioned. Side guides 216, adjustable toward and away from one another and carried by brackets 217, engage the ends of articles received on the conveyor apron 215 and retain the slices together as the articles are advanced over the apron 215 by flights 213 (Fig. 22). The discharge conveyor flights are mounted between spaced parallel endless chains driven by sprockets on shaft 218 journaled at the inner ends of the conveyor beam members 214. On one end of the shaft 218 is a sprocket 219 carrying a chain 220 which is driven by a sprocket 221 carried by the housing of a one point clutch to be later described and which is secured on main shaft 222.

Drive

The main drive shaft is rotatably mounted in journals 223 carried by brackets attached to either the main side frames or a cross member extending between the latter. A drive sprocket 225 also secured on the one point clutch housing is connected by a chain 226 to a sprocket 227 secured on an intermediate shaft 228 journaled in brackets carried by the main side frames.

The conveyor main drive shaft 180 is driven from the intermediate shaft 228 by means of a chain 229 trained around a sprocket 230 secured on the shaft 228 and a sprocket 231 which forms part of a compensator structure mounted on the conveyor drive shaft 180. This compensator comprises a block 232 (Figs. 1 and 12) secured on the end of the shaft 180 and having a hand grip extension 233 for manual rotation of the shaft. The sprocket 231 is rotatably mounted on the shaft 180 and is secured to a circular disc member 234. A spring pressed manually retractable plunger 235 slidably mounted in the compensator block 234 has an end receivable in any one of a number of recesses 236 formed in the compensator disc 234 for the purpose of establishing a driving connection between the compensator block and the driven disc 234. By withdrawing the plunger 235 the conveyor shaft 180 may be rotated with respect to the shaft 228 so as to adjust the position of the forwarding conveyor flights 185 back and forth with respect to the flights 213 of the discharge conveyor, the latter flights moving in synchronized relation to the shaft 228 through the drive connections previously described. Thus the article advancing cycle of one of the conveyors may be advanced or retarded with respect to the article advancing cycle of the other conveyor.

The article advancing mechanism of the present machine may be driven by any suitable source of power connected to the main drive shaft 222. In the case of a bread slicing machine to be coupled to a wrapping machine, it is preferable to drive the article advancing mechanism of the slicer from the wrapping machine so as to provide for the delivery of sliced articles into the wrapper in properly timed relation to the cyclic operation of the latter. Such a driving arrangement has previously been utilized and the present invention provides certain improvements in the drive of the article advancing mechanism of the slicing machine in relation to and in combination with a wrapping machine drive. A suitable wrapping machine to which the slicer of the present invention may be coupled is that disclosed in Patent No. 2,260,324, issued October 28, 1941.

The main drive chain or belt actuated by the wrapping machine is indicated in the present drawings at 238 and corresponds to the chain 67 shown in the patent referred to. This chain is trained around a sprocket 239 secured on a shaft 240 rotatably mounted in journals carried by the side frame of the machine.

Cyclized overload release

On the shaft 240, which is driven by the wrapping cycle of the wrapping machine, is mounted a cyclized overload release indicated generally at 241. This device, the details of which are illustrated in Figs. 21 and 22, comprises a sleeve 253 having a circular radial flange 254 at one end, the sleeve being secured for rotation with the shaft 240 by means of a key 255. A body member 256 is received on sleeve 253 and secured against relative rotation by a key 257. One end of the body 256 has an integral circular plate portion 258 which is spaced from the circular flange 254 of the inner sleeve. In such space is received a driven assembly comprising circular plate 259 and a sprocket 242. The sprocket and plate are secured together by screws 261 and one surface of the plate 259 is disposed flatwise against the end surface of the plate portion 258 formed on the body member 256. The driven assembly is rotatable on the sleeve 253, there being a cylindrical bushing 262 interposed between the parts. A flat antifriction bushing 263 is interposed between the sprocket 242 and the flange 254 of the sleeve. A suitable means, not shown, retains the body member 256 in fixed relation to the sleeve 253 so as to confine the driven assembly between the sleeve flange 254 and the plate portion 258 of the body member.

Arms 265, 266, and 267 are formed on the body member 256 and extend radially therefrom. These arms, which may be integral with the body member and the plate 258, are of different radial lengths and at their extremities are formed with bores 268 which parallel the axis of rotation of the shaft 240. The bores 268 extend through the plate portion 258 of the body member and are spaced different radial distances from the rotational axis of the device. Hardened steel balls 269 are received in the bores 268 and extend into mating sockets 270 formed in the confronting face of the circular plate 259 of the driven assembly. The steel balls are held against the plate 259 by helical coil compression springs 271 retained in the bores 268 and compressed by plugs 272 threaded into the outer ends of the bores. The body member 256 may be formed of a light metal casting and in such case hardened steel sleeves 273 may be inserted by press fits in the bores 268 to guide the balls 269.

The driving torque of the shaft 240 is transmitted to the body member 256 through the sleeve 253 and synchronous rotational motion is imparted to the driven assembly through the spring pressed balls 269 which serve to lock together the driven plate 259 and the driving plate 258. Around the driven sprocket 242 is trained a chain 243 that in turn drives sprocket 244 of a compensator or cycle adjusting device 245 mounted on one end of the main shaft 222.

Should a stoppage or accident cause an overload in the conveyor or escapement mechanisms of the slicing machine, the sprocket 242 would slow down or stop and the balls 269, carried at a constant rotational speed in the body member 256, would ride out of the recesses 270 in the plate member 259 and retract into the bores 268. Since the several arms on the body member 256 are of different radial lengths, the ball 269 carried in any one of the arms will not become engaged in any of the recesses formed in the driven plate 259 to accommodate the other balls. The balls 269 will become engaged in the corresponding recesses 270 to re-establish a driving connection between the parts only at one point during each relative rotation of the body member 256 with respect to the driven plate 259.

Should the overload or stoppage be relieved during a single revolution of the driven shaft 240, the slicing machine will "pick up" in correct timed relation to the wrapping machine. So long as the overload or stoppage continues, however, the body member 256 of the overload release will continue to rotate relative to the driven plate member 259 and the sprocket 242, the balls 269 riding into and out of the corresponding recesses on each revolution. By this arrangement of a cyclized overload release which is arranged to "pick up" at only a single relative rotational position, the predetermined timed relationship between the cyclic operation of the wrapping machine and the cyclic operation of the slicing machine is maintained and adjustment of the conveyors is not necessary after a stoppage due to an overload.

The use of a plurality of torque transmitting balls in the device provides smoother operation of the overload and permits finer adjustment. Excessive strain in the parts is avoided and a light weight economical device is obtained.

The compensator device 245 is similar to and functions like the pin carrying block 232 and apertured plate 234 carried by the shaft 189 and previously described in connection with the forwardly conveyor drive. A suitable construction for the compensator is that disclosed in prior Patent No. 2,379,911, issued July 10, 1945, and illustrated in that patent in Figs. 5 and 8.

By means of the compensator 245 the rotative position of the main shaft 222 may be adjusted with respect to the wrapper drive so as to simultaneously and synchronously advance or retract all the article advancing instrumentalities of the slicing machine with respect to the cycle phase of the wrapper so as to adjust the timing of the article discharge from the slicer in relation to the cyclic operation of the wrapper. Such adjustment may be required, for example, when the size or character of the article being processed or sliced is altered.

Should a stoppage occur in the conveyor system or article advancing mechanisms of the slicing machine, causing an increase in the torque transmitted through the shaft 240, the overload release drive 241 is arranged to slip, thereby allowing the slicing machine article advancing mechanisms to stop while the wrapper (and the drive chain 238) continues in motion.

The main shaft 222 which carries the compensator 245 on one end drives the article advancing mechanisms indirectly through a one-point clutch, indicated diagrammatically at 246. This one-point clutch is of conventional construction, preferably such as that illustrated in Figs. 12 and 13 of prior Patent No. 2,316,171, issued April 13, 1943. The arrangement of the one-point clutch is such that the conveyor drive sprockets 221 and 225, previously mentioned, are secured on the clutch drum or housing corresponding to the drum 183 of the prior patent for rotation therewith and in synchronism with one another. The actuating linkages, levers, solenoid and related parts for the one-point clutch are omitted from the drawings but may be similar to those shown in the prior patent referred to. A one-point clutch of this character in the driving connection between the shaft 222 and the sprockets 221 and 225, retains the phase relationship between the driving and driven parts when the connection is re-established after an interruption no matter how frequently or in what period of the cycle the driving connection is interrupted. After an interruption, the driving connection can only be re-established in a single predetermined phase relationship between the shaft and the sprockets. The one-point clutch of the character disclosed in prior Patent 2,316,171, when employed in the combination of the present invention, permits instantaneous stoppage of the article advancing mechanisms of the slicing machine, as in the case of an emergency, and insures that when the mechanisms are re-activated the driving connection will be established only in the same phase relationship that previously existed between the slicing machine mechanisms and the operating cycle of the wrapping machine or other succeeding article handling device.

As an alternative construction or combination and in lieu of using the instantaneously disconnectable one-point clutch of prior Patent 2,316,171, the limited stoppage type of one-point clutch shown in Figs. 6, 7, and 8 of prior Patent 1,964,824 for "Control for Bread Slicing Machines," issued July 3, 1934, is used in the driving connection between the shaft 222 and the sprockets 221 and 225. The driving lug 44 of the prior patent clutch is secured on the shaft 222 of the present apparatus and the driven member 41 and associated parts of the prior patent carry the sprockets 221 and 225 of the present apparatus. In this modified variation of the one-point clutch combination, actuation of the disengaging dog 48 of the prior patent operates to disconnect the drive at a single predetermined point in any revolution of the sprockets 221 and 225. Adjustment of the compensators 232 and 134 sets the article advancing mechanisms of the slicer so that when the combination employs the one-point clutch of Patent 1,964,824 and such clutch is actuated to interrupt the driving connection, stoppage occurs only when the articles being advanced are in predetermined positions in the article advancing mechanisms. Furthermore, this combination of driving or connecting means retains the phase relationship between the cyclic movement of the article advancing mechanisms of the slicer and the cyclic operation of the subsequent article handling apparatus such as the wrapper so that when the one-point clutch is reengaged the article advancing mechanisms of the slicer "pick up" only in predetermined cyclic or phase relationship with respect to the article handling cycle of the subsequent apparatus or wrapper. In other words, when employing the one-point clutch of Patent 1,964,824 both stopping and starting of the article advancing mechanisms of the slicer occurs through such clutch only when the mechanisms are in predetermined relative positions with respect to the wrapper. The driving connections are such that the shaft 222 makes one revolution for each article handling cycle of the slicing machine (and of the wrapping machine furnishing the driving power as well).

The driving arrangement described above is particularly advantageous for use in a slicing machine-wrapping machine combination when the combination is to process different types and sizes of articles. The several article advancing or handling mechanisms are serially connected and are arranged to handle an article in succession. By means of the novel combinations of compensators the phase relationship of several of the article forwarding mechanisms (the carrier and the forwarding conveyor) can be synchronously and simultaneously adjusted with respect to that of a succeeding article forwarding mechanism (the discharge conveyor). In addition, the phase relationship of one of the article handling mechanisms can be altered with respect to that of the succeeding mechanisms (the forwarding conveyor and the discharge conveyor) without altering the phase relationship between the forwarding and discharge conveyors.

These adjustments are especially advantageous to commercial bakery operators for the reason that the individual article advancing mechanisms can be adjusted to meet particular conditions that may arise in connection with the movement of articles through any one of them. Adjustments in the phase relationships of any two successive mechanisms can be made without altering the phase relationships of the other instrumentalities or mechanisms. In other words, by means of the clutches and compensators used in the mechanism of the present invention, the phase relationship adjustment can be localized in the desired zone, the other phase relationships existing in the machine being undisturbed by the remote adjustment.

Uniformity and precision in article handling are obtained by proper adjustment of the carrier bars 147. The angular position of the carrier can be altered with respect to the loading conveyor belt and the forwarding conveyor apron by manipulation of the adjustable length link 160. The amplitude of the oscillation of the carrier bars 147 can be varied by manipulation of the adjustable length arm 161. Lengthening the arm increases the amplitude, while shortening the arm decreases the amplitude of the oscillation.

The phase adjustment for the carrier bars 147 and the article intercepting gate 127 with respect to the article advancing flights 185 of the forwarding conveyor is accomplished by shifting the cam 134 rotatively on the shaft 135. This adjustment is accomplished by withdrawal of the plunger 139 which frees the cam 134 from the compensating block 147. The cam is then moved to the desired relative rotative position on the shaft and the plunger 139 is released to move into the appropriate recess in the cam. In the drawings only two of the recesses 140 are shown in the cam 134, one for wide articles, the other for narrow articles. A greater number may be provided if additional phase adjustments are desired between the article carrier and the forwarding conveyor flights. If extremely wide or extremely narrow bread loaves are to be processed, additional holes or recesses 140 may be provided in the cam 134 to obtain the most efficient operation.

The advancement of each article over the forwarding conveyor apron 174 by one of the flights 185 is interrupted by the release of the flight at the end of the apron and the dropping of the flight to inoperative position. Each article as it is advanced by a flight toward the endless cutter bands 7 engages the preceding article and forces it ahead. The articles are thus moved through the cutters and onto the apron 215 of the discharge conveyor in sliced condition. Each sliced article is engaged by one of the flights 213 of the discharge conveyor and carried along by such flight over the discharge conveyor apron. It is therefore advantageous to be able to precisely position the flights 213 of the discharge conveyor in such phase relation to the flights 185 of the forwarding conveyor that each time one of the flights 185 is released at the end of the conveyor apron 174 to drop out of the article advancing position a preceding article has been deposited on the apron of the discharge conveyor in advance of one of the discharge conveyor flights 213.

The compensator which includes the block 232 and the apertured plate 234 provides for alteration of the phase relationship between the carrier and the forwarding conveyor on the one hand and the discharge conveyor on the other hand. The forwarding conveyor flights 185 are shifted by the compensator either backward or forward with respect to the flights 213 of the discharge conveyor in order to regulate the movement of articles onto the apron 215 for pickup by the flights 213. Such shifting of the flights of one of the conveyors with respect to the flights of another conveyor of the apparatus is resorted to when a change in article size occurs.

It is recognized that flight phase compensators have been previously employed. The arrangement of the present invention, however, provides a system wherein a compensator for adjusting the phase relationship between the forwarding conveyor flights and the discharge conveyor flights also shifts the phase relationship of the carrier or other preceding article advancing instrumentality which operates in timed relation to the discharge conveyor flights. Furthermore, the driving arrangement of the present invention provides in combination with one-point clutch means for maintaining phase relationship between article handling instrumentalities while permitting optional stopping and starting of one such instrumentality and overload release means also for maintaining such phase relationship, a compensator arranged simultaneously to shift or alter the phase relationship of all of the article advancing instrumentalities with respect to the cyclic phase of the wrapping machine or apparatus with which the slicer of the present invention is to be coupled. Such phase shifting is accomplished without disturbing the relative phase relationships existing between the several article advancing mechanisms of the slicing machine.

*Mechanism enclosures*

As a sanitary measure and as a feature which facilitates servicing and repairing of the operating mechanisms, the frame design of the present slicing machine provides a substantially enclosed chamber on each side for housing the working parts such as the driving and interconnecting links, sprockets, cams, levers and arms of the article advancing mechanisms. Such parts are thus protected from dust and dirt and the bearings can be kept in well-oiled or lubricated condition without danger of contaminating food articles being processed. The supplemental frames 93 and 94 are substantially imperforate except for the journal openings provided therein to support the shafts and rods of the mechanisms. The lateral top flanges 111 formed on the supplemental side frames are continuous with laterally extending, angularly disposed rear and front flanges 248 and 249 respectively. The top, front and rear outwardly directed flanges of the frames are each formed with inwardly directed marginal edge portions or flanges 250 which are spaced from the main walls of the side frames 93 and 94. In the spaces so defined are situated the previously mentioned links, rods, arms and shaft ends as well as the carrier operating cam 134 and the drive sprockets and chains. To complete the enclosure flat covers 251 of the relatively thin sheet metal are positioned flatwise against the inturned flanges 197 and 250 of the supplemental side frames. By providing relatively heavy sectioned integral flanges 111, 249, and 250 which are re-enforced by the integral marginal edges 197 and 250, a frame structure of considerable strength is provided at minimum weight. Furthermore, the covers 251 may be conveniently stamped or cut from flat sheet metal and are readily replaced in case of damage. When the covers 251 are removed for purposes of servicing or repairing the mechanism, the lateral extensions 111, 249, and 250 of the supplemental side frames act as guards to prevent injury to the operator so that injuries resulting from being caught in the mechanism are less likely to occur.

The principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim is:

1. In article handling apparatus having a supporting structure and an infeed conveyor, a carrier and means mounting the same in the structure for movement to and away from an article receiving position at the discharge end of the conveyor, a stop spaced from the discharge end of said conveyor for engaging an article on the carrier and limiting its movement on the carrier, and mounting means for adjustably supporting the stop on the structure independently of said carrier, said mounting means being manually operable while the carrier is in motion to move the stop toward or away from the discharge end of said conveyor to accommodate articles of different sizes between said stop and the discharge end of the conveyor.

2. In article handling apparatus having a belt type infeed conveyor and forwarding mechanism, a metering device for intercepting articles at the discharge end of the infeed conveyor and intermittently transferring them into the mechanism, said metering device including a reciprocable stop and an oscillating carrier, drive means for the stop and carrier comprising a rotatable shaft having connection with the carrier including an adjustable length link to vary the position of the carrier relative to the conveyor at one limit of carrier movement, a rotatable cam on the shaft and a cam follower operatively connecting the cam to the stop, and means for altering the rotative position of the cam on the shaft during rotation of the latter to vary the phase relationship between the movement of the stop and the movement of the carrier in adjusting the apparatus to accommodate articles of different sizes.

3. In article handling apparatus, a belt type conveyor for advancing articles in side by side contacting relation, a flight type conveyor for receiving articles from the belt conveyor and advancing the received articles individually in spaced relation, an intermittently operated article intercepting device for engaging articles to control their discharge from the belt conveyor, and drive means common to the flight conveyor and the article intercepting device for timing the operation of said intercepting device with respect to the travel of said flight conveyor, and means for driving said belt conveyor including change speed means for altering the linear speed of the belt conveyor for articles of different size to minimize sliding of the belt conveyor under articles engaged by said intercepting device.

4. In article handling apparatus having spaced structural members and a conveyor for bridging the space between the structural members, the conveyor including a frame pivoted on one of the structural members and swingable to and from bridging position, rotatable elements on the conveyor for advancing articles thereover, driven means for advancing articles through the apparatus, said means including a driven rotatable element carried by the other structural member adjacent the movable discharge end of the conveyor for frictionally engaging articles moving from the latter, main drive means carried by said other structural member and having connection with the driven rotatable element to actuate the latter, and disconnectable drive means carried by the conveyor and by said other structural member and having connection with the main drive means for automatically establishing synchronized driving between the rotatable elements of the conveyor and the rotatable driven element on the other structural member when the conveyor is in bridging position and for automatically interrupting the conveyor drive upon movement of the conveyor away from bridging position.

5. In article handling apparatus having horizontally separated structural frame members and a driven conveyor for bridging the space between the members, means pivotally mounting the conveyor on one of said structural members for swinging movement to and from bridging position, rotatable drive means carried by the other of the structural members, a stop and means mounting the same on said other structural member for reciprocating movement across the discharge end of the bridging conveyor, means having connection with the rotatable drive means for cyclically actuating the stop, a rotatable element carried by said other structural member and positioned across the conveyor discharge end between the latter and the stop to receive articles from the conveyor, said element being drivingly connected to the drive means to be actuated thereby to assist in advancing articles, and means for automatically establishing a driving connection between the drive means and the conveyor upon movement of the latter to bridging position to actuate the latter and for automatically disconnecting such conveyor driving connection upon swinging of the conveyor away from bridging position.

6. In article handling apparatus having a conveyor and an intermittently moving stop member adjacent the discharge end of the conveyor movable into and out of a position intercepting articles fed by the conveyor, a driven rotatable member between the discharge end of the conveyor and said stop member to frictionally engage articles and assist in moving them off the end of the conveyor, and means moving in timed relation to the stop member for lifting an intercepted article out of engagement with the rotatable member.

7. A driving mechanism for interconnected machines which handle articles cyclically, one machine having a plurality of article advancing mechanisms arranged serially to advance articles therethrough cyclically and in succession, said driving mechanism including means for driving the article advancing mechanisms comprising a rotatable member, driving means for connecting said member to the other of said machines, a first phase-compensating means connected to said rotatable member for actuation thereby and having driving connection with said article advancing mechanisms, said phase adjusting means being operable simultaneously to shift in unison the several article advancing mechanisms simultaneously to alter the phases thereof with respect to the phase of said rotatable member, a second phase-adjusting means interposed in the connection between the first phase-adjusting means and one of the article advancing mechanisms for altering the phase relationship between said last named article advancing mechanism and others of the article advancing mechanisms, and one-point clutch means in the driving connection between said rotatable member and said article advancing mechanisms operable to interrupt and establish a driving connection between said driving means and a plurality of said article advancing mechanisms simultaneously, the one-point clutch means being arranged to establish the driving connection after an interruption thereof at only a single predetermined point in the phase relationship of the driven rotatable member and the article advancing cycle of said article advancing mechanisms.

ARTHUR A. KOTTMANN.

REFERENCES CITED

The following references are of record in the file of this patent:

UNITED STATES PATENTS

| Number | Name | Date |
|---|---|---|
| 498,323 | Storle | May 30, 1893 |
| 512,377 | Hooper | Jan. 9, 1894 |
| 562,534 | Hollingsworth | June 23, 1896 |
| 1,333,886 | Van Houten | Mar. 16, 1920 |
| 2,328,911 | Kottmann | Sept. 7, 1943 |
| 2,374,326 | Bourland | Apr. 24, 1945 |
| 2,379,911 | Kottmann | July 10, 1945 |
| 2,380,172 | Harber | July 10, 1945 |
| 2,395,511 | Simpson | Feb. 26, 1946 |
| 2,427,108 | Petskeyes | Sept. 9, 1947 |
| 2,493,591 | Newton | Jan. 3, 1950 |

FOREIGN PATENTS

| Number | Country | Date |
|---|---|---|
| 284,845 | Great Britain | Feb. 9, 1928 |